United States Patent
Kumar et al.

(10) Patent No.: US 10,609,673 B2
(45) Date of Patent: Mar. 31, 2020

(54) REFERENCE SIGNAL MEASUREMENT IN MOBILE DEVICE HAVING MULTIPLE ANTENNA RECEIVER

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/966,420

(22) Filed: Apr. 30, 2018

(65) Prior Publication Data

US 2019/0335416 A1 Oct. 31, 2019

(51) Int. Cl.
*H04W 64/00* (2009.01)
*G01S 5/10* (2006.01)
(Continued)

(52) U.S. Cl.
CPC ............. *H04W 64/006* (2013.01); *G01S 5/10* (2013.01); *H04L 5/005* (2013.01); *H04W 72/048* (2013.01); *H04W 72/14* (2013.01)

(58) Field of Classification Search
CPC . H04W 64/006; H04W 72/14; H04W 72/048; H04L 5/005; G01S 5/10
(Continued)

(56) References Cited

U.S. PATENT DOCUMENTS

2012/0252487 A1 10/2012 Siomina et al.
2014/0141799 A1 5/2014 Rousu et al.
(Continued)

FOREIGN PATENT DOCUMENTS

WO 2012008727 A2 1/2012
WO 2012099515 A1 7/2012

OTHER PUBLICATIONS

Coolpad: "Multi-Beam MRS and RRM Measurement", 3GPP Draft, 3GPP TSG RAN WG1 Meeting #88, R1-1702768, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051209915, 3 Pages, Retrieved from the Internet: URL:http://www.3gpp.org/ftp/Meetings_3GPP_SYNC/RAN1/Docs/ [retrieved on Feb. 12, 2017].
(Continued)

*Primary Examiner* — Julio R Perez
(74) *Attorney, Agent, or Firm* — Mahmoud Munes Tomeh; Bala Ramasamy

(57) ABSTRACT

Methods and apparatuses are described relating to changes in an antenna configuration of a multi-antenna radio frequency (RF) transceiver between reference signal occasions. In one set of examples, a first antenna configuration at a first reference signal occasion of a first RF transmitter is stored, and if the antenna configuration has changed by the time a second reference signal occasion of the first (same) RF transmitter begins, the antenna configuration is switched back to the first antenna configuration. In another set of examples, compensation data to enable compensation between the first antenna configuration used to measure a first reference signal of a reference RF transmitter and a second antenna configuration used to measure a second reference signal of a neighboring (different) RF transmitter is retrieved and used when computing a time difference between the first and second reference signals.

32 Claims, 8 Drawing Sheets

(51) Int. Cl.
  *H04L 5/00*    (2006.01)
  *H04W 72/04*   (2009.01)
  *H04W 72/14*   (2009.01)
(58) Field of Classification Search
  USPC .................................................. 455/456.1
  See application file for complete search history.

(56) References Cited

U.S. PATENT DOCUMENTS

| | | | |
|---|---|---|---|
| 2015/0208269 A1* | 7/2015 | Damnjanovic | H04L 1/0026 370/252 |
| 2016/0066302 A1* | 3/2016 | Han | H04W 24/10 370/329 |
| 2016/0170005 A1* | 6/2016 | Pon | G01S 5/06 455/456.1 |
| 2016/0191176 A1* | 6/2016 | O'Keeffe | H01Q 3/267 455/63.4 |
| 2017/0059689 A1* | 3/2017 | Edge | G01S 5/0289 |
| 2018/0091196 A1* | 3/2018 | Frenne | H04B 7/0408 |
| 2018/0109302 A1 | 4/2018 | Nagaraja et al. | |
| 2019/0082288 A1* | 3/2019 | Kumar | H04W 4/02 |
| 2019/0097740 A1* | 3/2019 | Kumar | H04B 17/309 |
| 2019/0132861 A1* | 5/2019 | Koorapaty | H04W 72/1289 |

OTHER PUBLICATIONS

International Search Report and Written Opinion—PCT/US2019/029155—ISA/EPO—Sep. 30, 2019.

* cited by examiner

REFERENCE SIGNAL MEASUREMENT IN MOBILE DEVICE HAVING MULTIPLE ANTENNA RECEIVER

BACKGROUND

Field

This disclosure relates to reception of wireless signals for performing positioning for mobile wireless devices.

Background

A mobile wireless device can be in wireless communication with a serving cell for transmission and reception of data and/or voice. However, for positioning using ground-based transmitters such as positioning using signal measurements of received wireless signals from a plurality of wireless transmitters, the serving cell may stop transmission of data and/or voice to provide a measurement gap to allow the mobile wireless device to measure reference signals received from neighboring cells other than the serving cells. The measurement gap allows the receiver or transceiver of the mobile wireless device to measure the received signals without missing any data transmission from the serving cell. In some situations, the carrier frequency for data and/or voice transmissions from the serving cell and the reference signal frequency for reference signal transmissions from a neighboring cell can also be different, and hence the measurement gap can further allow the mobile wireless device receiver or transceiver to tune its frequency away from the carrier frequency to a reference signal frequency to make the measurements as desired.

SUMMARY

An example method for performing a measurement of reference signals using a multi-antenna radio frequency (RF) transceiver can include storing a first antenna configuration of the multi-antenna RF transceiver at the start of a first reference signal occasion of a first RF transmitter. At or before the start of a second reference signal occasion of the first RF transmitter, the method can further include determining whether an antenna configuration of the multi-antenna RF transceiver has changed from the stored first antenna configuration. Responsive to a determination that the antenna configuration of the multi-antenna RF transceiver has changed from the stored first antenna configuration, the method can further include switching the antenna configuration of the multi-antenna RF transceiver back to the stored first antenna configuration. The method can then include measuring a first reference signal during the second reference signal occasion of the first RF transmitter while the multi-antenna RF transceiver is in the first antenna configuration. During the first reference signal occasion of the first RF transmitter, one or more antenna parameters can be determined. These antenna parameters can be stored. When measuring the first reference signal during the second reference signal occasion of the first RF transmitter, the one or more antenna parameters can be used. Similar procedures can be performed for a second RF transmitter. Hence, for example, the method can further include storing a second antenna configuration at the start of a first reference signal occasion of a second RF transmitter; determining one or more antenna parameters during the reference signal occasion of the second RF transmitter; determining, before the start of a second reference signal occasion of the second RF transmitter, whether an antenna configuration of the multi-antenna RF transceiver has changed from the second antenna configuration, and if the antenna configuration has changed, switching the antenna configuration of the multi-antenna RF transceiver back to the second antenna configuration and measuring a second reference signal during the second reference signal occasion of the second RF transmitter while the multi-antenna RF transceiver is in the second antenna configuration.

In another example, a mobile device can comprise a multi-antenna radio frequency (RF) transceiver, a memory, and one or more processors coupled to the memory and the wireless transceiver. The one or more processors and the memory can be configured to store, in the memory, a first antenna configuration of the multi-antenna RF transceiver at the start of a first reference signal occasion of a first RF transmitter and determine, at or before the start of a second reference signal occasion of the first RF transmitter, whether an antenna configuration of the multi-antenna RF transceiver has changed from the first antenna configuration stored in the memory. If the antenna configuration has changed from the stored first antenna configuration, the one or more processor and the memory can be configured to switch the antenna configuration of the multi-antenna RF transceiver back to the first antenna configuration stored in the memory, and then measure a second reference signal during the second reference signal occasion of the first RF transmitter while the multi-antenna RF transceiver is in the first antenna configuration.

In another example, an apparatus for performing a measurement of reference signals using a multi-antenna radio frequency (RF) transceiver can include means for storing a first antenna configuration of the multi-antenna RF transceiver at the start of a first reference signal occasion of a first RF transmitter; means for determining, at or before the start of a second reference signal occasion of the first RF transmitter, whether an antenna configuration of the multi-antenna RF transceiver has changed from the stored first antenna configuration; means for, responsive to a determination that the antenna configuration of the multi-antenna RF transceiver has changed from the stored first antenna configuration, switching the antenna configuration of the multi-antenna RF transceiver back to the stored first antenna configuration; and means for measuring a first reference signal during the second reference signal occasion of the first RF transmitter while the multi-antenna RF transceiver is in the first antenna configuration.

A method for performing a measurement of reference signals using a multi-antenna radio frequency (RF) transceiver can include measuring a first reference signal from a reference RF transmitter while the multi-antenna RF transceiver is in a first reference signal antenna configuration to obtain a first reference signal measurement and measuring a second reference signal from a neighboring RF transmitter while the multi-antenna RF transceiver is in a second reference signal antenna configuration to obtain a second reference signal measurement. The method can then include determining whether the second reference signal antenna configuration is different from the first reference signal antenna configuration. If the second reference signal antenna configuration is different from the first reference signal antenna configuration, the method can include retrieving compensation data and then compensating the second reference signal measurement using the compensation data to determine a compensated second reference signal measurement. In various implementations of the method, for example, the first reference signal and the second reference signal comprise positioning reference signals (PRS) signals and the first reference signal measurement and the compensated second reference signal measurement comprise timing measurements. In one example, the compensation data can include a group delay between the first reference signal antenna configuration and the second reference signal antenna configuration. In one example, the first reference signal measurement and the compensated second reference signal measurement are used to compute a reference signal time difference (RSTD) measurement between the first reference signal transmitted by the reference RF transmitter and the second reference signal transmitted by the neighboring RF transmitter.

In yet another example, a mobile device can include a multi-antenna radio frequency (RF) transceiver, a memory, and one or more processors coupled to the memory and the wireless transceiver. The one or more processors and the memory can be configured to measure a first reference signal from a reference RF transmitter while the multi-antenna RF transceiver is in a first reference signal antenna configuration to obtain a first reference signal measurement and measure a second reference signal from a neighboring RF transmitter while the multi-antenna RF transceiver is in a second reference signal antenna configuration to obtain a second reference signal measurement. The one or more processors and the memory can further be configured to then determine whether the first reference signal antenna configuration is different from the second reference signal antenna configuration and, responsive to a determination that the second reference signal antenna configuration is different from the first reference signal antenna configuration, retrieve compensation data. The one or more processors and the memory can further be configured to then compensate the second reference signal measurement using the compensation data to determine a compensated second reference signal measurement.

In yet another example, an apparatus for performing a measurement of reference signals using a multi-antenna radio frequency (RF) transceiver can include means for measuring a first reference signal from a reference RF transmitter while the multi-antenna RF transceiver is in a first reference signal antenna configuration to obtain a first reference signal measurement and means for measuring a second reference signal from a neighboring RF transmitter while the multi-antenna RF transceiver is in a second reference signal antenna configuration to obtain a second reference signal measurement. The apparatus can then further include means for determining whether the second reference signal antenna configuration is different from the first reference signal antenna configuration. The apparatus can then further include means for, responsive to a determination that the second reference signal antenna configuration is different from the first reference signal antenna configuration, retrieving compensation data and means for compensating the second reference signal measurement using the compensation data to determine a compensated second reference signal measurement.

DETAILED DESCRIPTION

Figure 1:
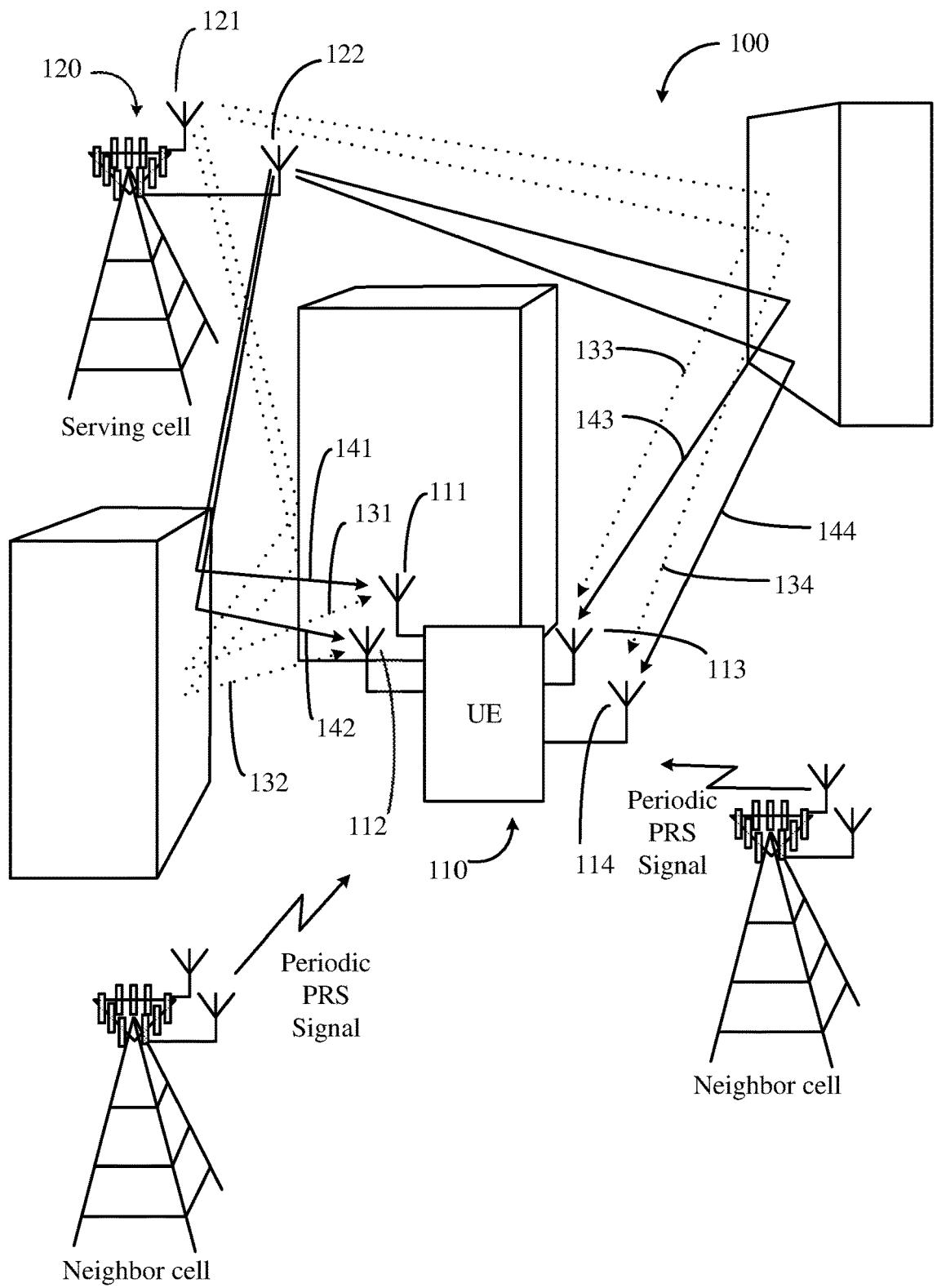
FIG. 1 illustrates one example of a multiple antenna mobile wireless device in a multipath signaling environment.

A communication system based on a base station transmitter and a mobile station receiver can one of a single input single output (SISO) system, where both the transmitter and receiver have only one antenna; a single input multiple output (SIMO) system, where the transmitter has one antenna, but the receiver has multiple antennae; a multiple input single output (MISO) system, where the transmitter has multiple antennae, but the receiver has a single antenna; and multiple input multiple output (MIMO) system, where both the transmitter and the receiver have multiple antennae. Work on MIMO in the 1990s showed that different data streams could be transmitted at the same time on the same frequency by exploiting multipath propagation from a pair of transmit antennae to a pair of receiver antennae. Further developments showed that the processing used to decode received symbols is simplified using orthogonal frequency division multiplexing (OFDM) because OFDM converts a high-speed data channel into a number of parallel lower-speed channels.

Using a MIMO system, multipath interference can be exploited to improve performance rather than degrade performance. In one example, link robustness can be improved using spatial diversity. In a spatial diversity example, multiple transmit antennae, for example two transmit antennae, transmit the same symbol, message, and/or data. The multiple receive antennae, for example two receive antennae, receive the same symbol, message, and/or data, and using digital signal processing techniques can recover the symbol, message, and/or data using the signals received from each of the multiple receive antennae. When the multiple transmit antennae are spaced apart sufficiently, for example spaced apart by approximately one half of the wavelength of the transmit carrier frequency, the data transmitted can propagate over a sufficiently different propagation path due to multipath propagation so that spatial diversity can improve the robustness of the wireless link. Given that for a 1 GHz signal, one half of a wavelength can be approximately 15 cm, it is understood that for carrier frequencies in the high MHz and/or low GHz range and greater, separation of transmit antennae by the one half wavelength distance can practically be achieved on a single wireless base station tower.

Furthermore, for a MIMO communications system, where the mobile wireless device is to use a pair of antennae, for example a first antenna and a second antenna, to receive the signal using each of the pair of antennae for spatial diversity there may be further advantage for the mobile wireless device to have a total number of antennae greater than the two antennae to enable the mobile wireless device to switch between different antenna pairs to enable the mobile device to use one antenna pair in situations where one antenna pair can achieve better channel characteristics than other pairs. Hence, for example, mobile wireless device performance can be improved by providing the mobile wireless device radio frequency (RF) receiver with four possible antennae, such as a first, second, third, and fourth antennae. In such a case, the mobile device can periodically test different antennae pairs, for example a first pair including the first and second antennae, a second pair including the first and third antennae, a third pair including the first and fourth antennae, a fourth pair including the second and third antennae, a fifth pair including the second and fourth antennae, and a sixth pair including the third and fourth antennae, and choose the pair providing the best ability to recover the transmitted symbols, messages, and/or data from the signals received by the antenna pair. As such, a multi-antenna RF receiver can include more antennae than the number of antennae to be used in the MIMO scheme, and the mobile wireless device and/or the RF receiver of the mobile wireless device can be capable of dynamically changing configurations by changing from reception using one antenna pair to reception using another antenna pair as the signaling environment, channel characteristics, and/or parameters of the received signals change. In one example, one antenna of the antenna pair can be selected based on the antenna that receives the best received signal strength indicator (RSSI) from a given base station. In another example, one antenna of the antenna pair can be selected based on a highest signal to noise ratio (SNR) value. In another example, one antenna of the antenna pair can be selected based on a least transmit power capable of communicating with the base station. Other quantities which can be used to select at least one antenna of the antenna pair can include other RSSI-based quantities such as Reference Signal Received Power (RSRP) and Reference Signal Received Quality (RSRQ), hence at least one antenna of the antenna pair can be selected which has, for example, the highest RSSI, SNR, RSRP or RSRQ.

Further still, it is understood that even in a single receive antenna context, a mobile wireless device RF receiver may include a plurality of receive antennae, for example, at different locations in the mobile device. In such a design, the mobile wireless device receiver can dynamically switch from one antenna to another based on which antenna provides the best performance, for example, where the performance is measured, for example, by one or more of a received signal strength indicator (RSSI), the highest SNR value, or other performance characteristic as described above.

As such, it can be seen that mobile wireless devices having multiple antennae communicatively coupled to the RF receiver can have advantages over RF receivers having or communicatively coupled to only a single antenna. However, it has been found that as the RF receiver switches from one antenna to another, or one pair of antennae to another pair of antennae, while receiving and transmitting data (including voice), such changes in antennae configuration can complicate the measurement of reference signals, such as positioning reference signals (PRS) signals, used for computing the position of the mobile device.

FIG. 1 illustrates one example of a multiple antenna mobile wireless device in a multipath signaling environment. As shown, mobile wireless device 110, also labeled in the figure as a user equipment (UE), includes multiple antenna, first receiver antenna 111, second receiver antenna 112, third receiver antenna 113, and fourth receiver antenna 114. As schematically illustrated, multipath signaling environment 100 include many objects, here illustratively shown as buildings, which cause reflections of RF signals travelling from a serving cell base station 120, for example, an evolved node B (eNB) to the mobile wireless device 110.

Traditionally, the presence of bodies from which RF signals may reflect was seen as a source of interference, including constructive and destructive interference, as the RF signal from a transmitting antenna reaches the receiving antenna through multiple different paths that can interfere with each other. However, as described above, using a MIMO approach, where the same message is simultaneously transmitted over the same frequency using multiple spatially diverse, i.e., not co-located (for example, spaced one half of a wavelength corresponding to the carrier frequency travelling in air, or close to one half of a wavelength), antennae and the message is also received using multiple spatially diverse antennae, the power of the received signal can be improved and the multipath environment may can be exploited to improve signal reception relative to using only a single transmit and single receive antenna.

With continued reference to FIG. 1, base station 120 transmits a message or other data using signals propagating in the signaling environment 100. As shown, base station 120 transmits the data using a first transmit antenna 121 and a second transmit antenna 122. Since both the transmit side and the receive side include multiple antennae, as illustrated, the signal transmitted can reach the mobile wireless device 110 through multiple signal paths. For example, the signal can reach the mobile wireless device 110 from the first transmit antenna 121 through four possible paths, for example, from transmit antenna 121 to receiver antenna 111 via signal path 131, from transmit antenna 121 to receiver antenna 112 via signal path 132, from transmit antenna 121 to receiver antenna 113 via signal path 133, and from transmit antenna 121 to receiver antenna 114 via signal path 134, where all signal paths from transmit antenna 121 to receiver antennae 111, 112, 113, 114 are shown as dotted lines. It is understood that signal paths 131, 132, 133, 134 each only represent a schematic path from transmit antenna to receiver antennae 111, 112, 113, 114 for the purposes of illustration and may not represent realistic propagation paths. Furthermore, in an environment with many bodies from which signals can reflect, including bodies of water, homes, buildings, civic structures, vehicles (including automobiles, trains, airplanes, etc.), people, and other RF reflectors, it is understood that from transmit antenna 121 to each of receiver antennae 111, 112, 113, 114, there are in fact a plurality of propagation paths, not simply one signal path.

With continued reference to FIG. 1, for example, the signal can also reach the mobile wireless device 110 from the second transmit antenna 122 through four possible paths, for example, from transmit antenna 122 to receiver antenna 111 via signal path 141, from transmit antenna 122 to receiver antenna 112 via signal path 142, from transmit antenna 122 to receiver antenna 113 via signal path 143, and from transmit antenna 122 to receiver antenna 114 via signal path 144, where all signal paths from transmit antenna 122 to receiver antennae 111, 112, 113, 114 are shown as solid lines. It is understood that signal paths 141, 142, 143, 144 each only represent a schematic path from transmit antenna to receiver antennae 111, 112, 113, 114 for the purposes of illustration and may not represent realistic propagation paths. Furthermore, in an environment with many bodies from which signals can reflect, including bodies of water, homes, buildings, civic structures, vehicles (including automobiles, trains, airplanes, etc.), people, and other RF reflectors, it is understood that from transmit antenna 122 to each of receiver antennae 111, 112, 113, 114, there are in fact a plurality of propagation paths, not simply one signal path.

Although mobile wireless device 110 is illustrated with a plurality of antennae greater than two antennae, it is understood that certain advantages may still be achieved with the mobile wireless device having only two antennae, for example, only receive antenna 111 and receive antenna 114. In such a scenario, the multiple transmit antennae 121, 122 could transmit data and the mobile wireless device could activate either of receive antennae 111 or 114 that receives the best signal. In some implementations, the mobile wireless device 110 could also use both receive antennae 111 and 114 simultaneously to receive the signals transmitted by transmit antennae 121, 122.

By way of explanation, consider transmit antenna 121 of base station 120. Signal paths 131 and 132 have certain propagation characteristics due to the number of reflections along both of the signal paths from transmit antenna 121 to each of receive antennae 111 and 112. However, signal paths 133 and 134 from antenna 121 to antennae 113 and 114 are different as the number of reflections is different. This is due both to the difference in the location of receive antennae 111 and 112 relative to receive antennae 113 and 114, also referred to as spatial diversity. Similarly, on the transmit side, antennae 121 and 122 are also spatially diverse. Hence, by choosing, for example, a pair of antennae from which to receive the signal transmitted by the two antennae 121, 122 of the base station 120 the difference in the propagation characteristics can be used to make a more robust communication scheme that one in which a single antenna receives the signal.

With reference again to FIG. 1, and in the context of a MIMO system where the mobile wireless device 110 has a plurality of receive antennae, illustrated here as four, the mobile wireless device 110 can be capable of selecting from a plurality of possible receive antenna pairs to select the receive antenna pair receiving the strongest signal or otherwise receive the best signal for reconstructing the transmitted data. Hence the mobile wireless device 110 can select two antennae from the illustrated four antennae 111, 112, 113, 114, thereby selecting a pair of antennae or an antenna pair, that provides the best receive signal for reconstructing the transmitted signal. Since the mobile wireless device can move around, and reflecting objects can also move around, signal paths, such as the illustrated signal paths 131, 132, 133, 134, 141, 142, 143, 144 will generally not remain static, and as such, can change from time to time in such a way that a signal path from a transmit antenna to a receive antenna (or a plurality of signal paths) that was able to be received and from which the data could be reconstructed may later no longer be an good signal path in comparison to the other available signal paths. As such, from time to time, the mobile wireless device can be configured to switch an antenna configuration by, for example, changing which single antenna to use to receive signals or changing which antenna pair to use to receive signals.

Although the above description briefly describes a MIMO spatial diversity scenario, it is understood that other scenarios and techniques may also use multiple transmit and/or multiple receive antennae such as MIMO spatial multiplexing, carrier aggregation, as well as other techniques. Furthermore, while in the description above and elsewhere in this specification, the antennae 111, 112, 113, 114 of the mobile wireless device 110 are described as receive antennae and the antennae 121, 122 of the base station 120 are described as transmit antennae for ease of explanation, it is understood that more generally, the antennae 111, 112, 113, 114 of the mobile wireless device 110 and the antennae 121, 122 of the base station 120 can be capable of both reception and transmission and may be part of or communicatively coupled to a transceiver device within the mobile wireless device 110 or the base station 120, respectively.

Figure 2A:
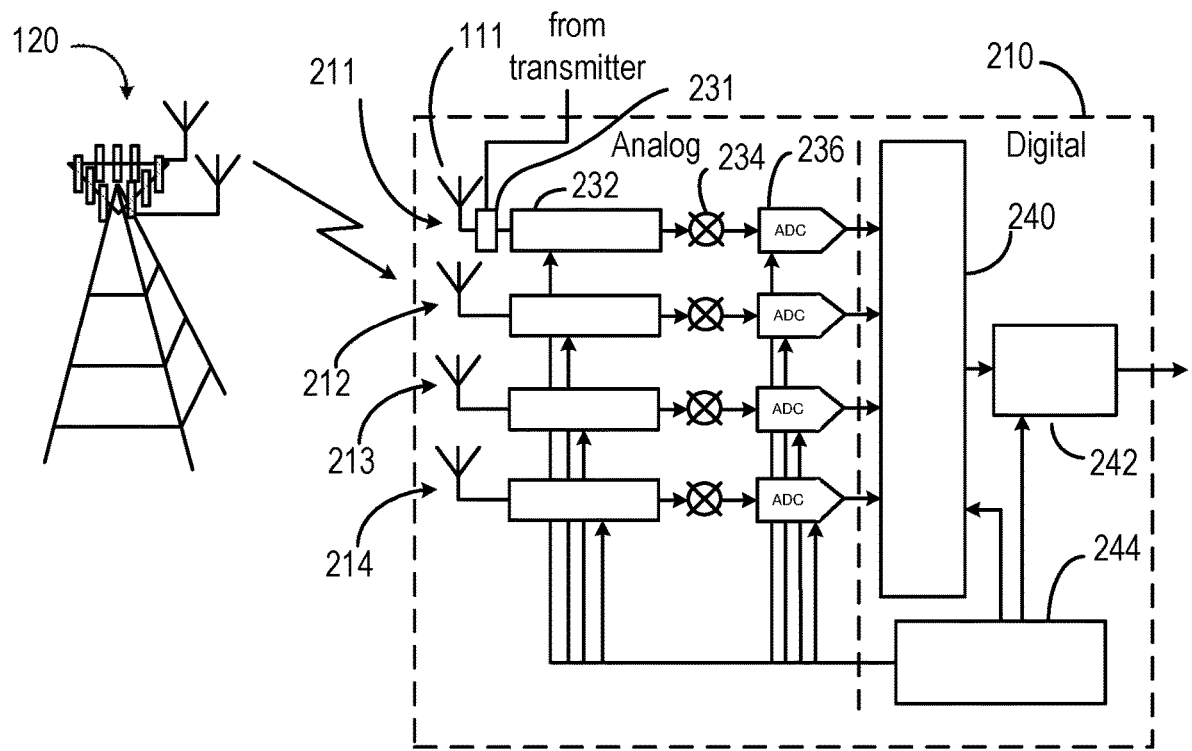
FIG. 2A illustrates an example RF transceiver that includes a plurality of antennae connected to independent receiver chains, where the example RF transceiver can be included in a device such as the mobile wireless device illustrated in FIG. 1.

FIG. 2A illustrates an example RF transceiver that includes a plurality of antennae connected to independent receiver chains which can be included in a device such as the mobile wireless device 110, each receiver chain including an antenna similar to the antennae 111, 112, 113, 114 of mobile wireless device 110. As illustrated, RF transceiver 210 includes four receiver chains 211, 212, 213, 214. Exemplary receiver chain 211 includes an analog portion and a digital portion schematically separated by a dashed line for ease of illustration. The analog portion of RF transceiver 210 may, in some situations, be referred to as an RF receiver or transceiver, while the digital portion may be referred to as a mobile baseband modulator-demodulator (modem), and while FIG. 2A illustrates them as though they are a single device, it is understood that in various implementations, the RF receiver or transceiver may be integrated on a single silicon chip with the mobile baseband modem, and may also be on two different silicon chips that are routed appropriately to provide for electrical communication between the components of both chips. It is further understood that while RF transceiver 210 is described as a transceiver, it may, in some implementations, be an RF receiver.

As illustrated, the analog portion includes antenna 111, duplexer 231, a bandpass filter (BPF) and/or low noise amplifier (LNA) illustrated as LNA 232, a mixer 234, and an analog to digital converter (ADC) 236. In various implementations, LNA 232 may include an integrated BPF, a BPF may be disposed before LNA 232, or LNA 232 may be alone without a BPF. When referring to LNA 232 in the rest of this specification, it is understood that all of these implementations are possible. Antenna 111 can be configured to receive transmitted radio waves from the air for further processing by the RF transceiver 210. In implementations where RF transceiver 210 is capable both of transmitting and of receiving RF signals, receiver chain 211 includes duplexer 231 which receives signals from a transmitter portion (not illustrated) of the transceiver 210 to allow for transmission of RF signals over antenna 111. Duplexer 231 is shown only for receiver chain 211 in order not to unduly clutter FIG. 2A, but it is understood that in transceiver implementations, generally speaking, the remaining receiver chains will also include a duplexer 231, although this is not necessarily so. After duplexer 231, in the illustrated implementation, the signal can then be conditioned by one or more low noise amplifiers and/or band pass filters as illustrated by LNA 232. In one implemention, the signal is amplified using a first LNA (also sometimes referred to as an RF gain stage amplifier), then filtered using a receive RF bandpass filter to reject out-of-band interference and transmitter leakage, and then amplified using a second LNA (also sometimes referred to a second stage amplifier, which can help maintain receiver noise figure and sensitivity). The signal can then be mixed using mixer 234 in order to downconvert the received RF signal to an intermediate frequency (IF) signal that may be in a low megahertz (MHz) range, for example, less than 100 MHz. Although illustrated as a simple mixer for ease of illustration, it is understood that in more realistic scenarios, mixer 234 may actually be a quadrature downconverter which provides two outputs, an in-phase output (I) and a quadrature output (Q). The ADC 236 then converts the output of the mixer 234, including as just described, in some implementations, both I and Q components, to a digital signal for further processing by the baseband processor 242.

Before the signal is processed by the baseband processor 242, an antenna multiplexer 240 including circuitry routes the outputs of the selected receiver chain(s) for subsequent digital processing by, for example, baseband processor 242. The antenna multiplexer 240 can include one or more switches and/or multiplexers to allow routing of signals from one receiver chain, a pair of receiver chains, or a plurality of receiver chains to the baseband processor 242 for digital processing. The RF transceiver 210 can also include a controller 244 capable of controlling components in each of the receiver chains 211, 212, 213, 214 to, for example, turn on or off (or to leave in a non-active low-power state) the receiver chains and/or to select which receiver chains to activate. Furthermore, the controller can control the antenna multiplexer to route (i) signals from the selected receiver chain (including selecting the antenna associated with the selected receiver chain), (ii) signals from the selected receiver chain pair (including selecting the antenna pair, each antenna of the antenna pair associated with each receiver chain of the selected receiver chain pair), or (iii) signals from the selected plurality of receiver chains (including selecting the plurality of antennae, each antenna of the selected antennae associated with each receiver chain of the plurality of selected receiver chains) to the baseband processor 242 for further digital processing.

Baseband processor 242 can include many functions involved in the digital processing of the received signal which may commonly be referred to as the mobile baseband modem. For example, after conversion to a digital signal (or a pair of I and Q digital signal components for each receiver chain of receiver chains 211, 212, 213, 214), the signal may be processed by a digital low pass filter to limit noise bandwidth, reject out-of-band interference and cross modulation. The signal may then be adjusted by a digital automatic gain control (DAGC) component to adjust signals to the levels usable by the receiver, which can be, as one example, a Rake receiver. A Rake receiver comprising a plurality of correlators and a combiner can perform product integration to despread the pseudorandom codes and the Walsh codes, for example. The signal may then be de-scrambled, de-interleaved, and (Viterbi, for example) decoded after processing by the Rake receiver. In the case of audio data (for a phone call, for example), other logic can include audio compression/de-compression (CODEC) functions and speaker related-functions to render the data into audio.

Figure 2B:
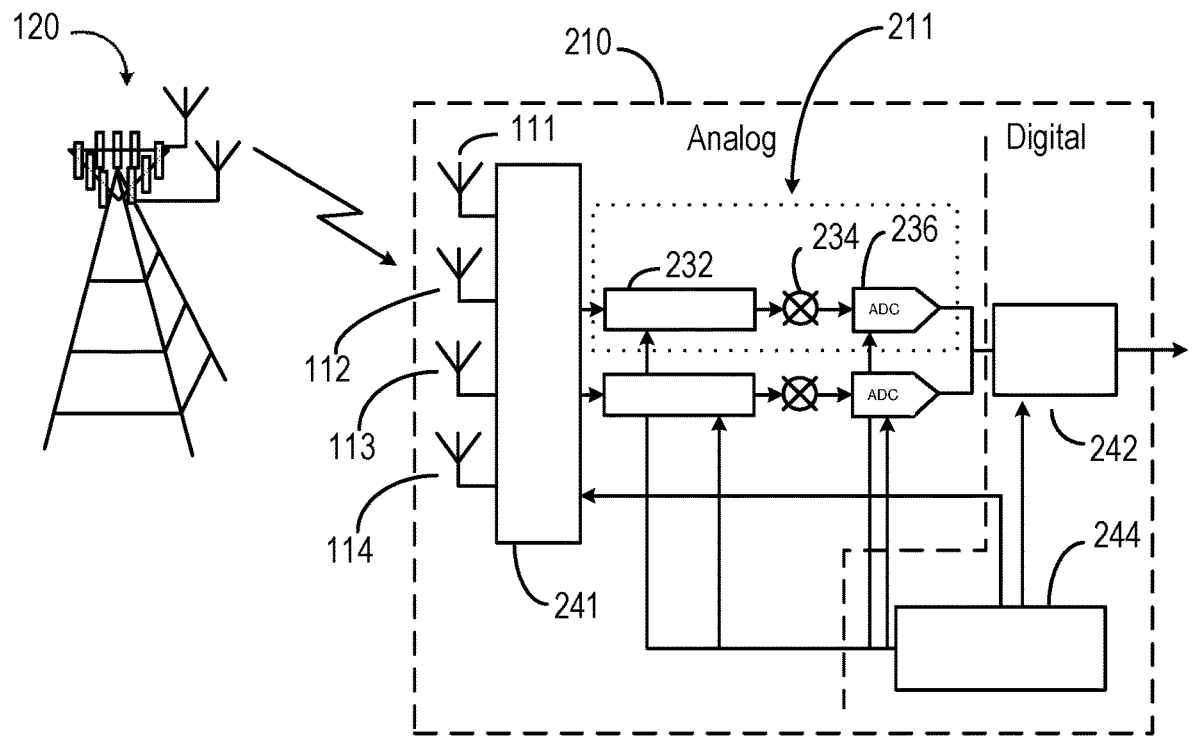
FIG. 2B illustrates another example RF transceiver that includes a plurality of antennae sharing two receiver chains connected to independent receiver chains, where the other example RF transceiver can be included in a device such as the mobile wireless device illustrated in FIG. 1.

FIG. 2B illustrates another example RF transceiver similar to the RF transceiver of FIG. 2A, however, in FIG. 2B the RF transceiver includes a plurality of antennae that can share receiver chains. In the example of FIG. 2B, there are only two receiver chains, such as receiver chain 211 shown in FIG. 2A, within a dotted rectangle, to reduce the number of redundant components, as compared to the RF transceiver 210 of FIG. 2A. However, in the example of FIG. 2B, only a maximum of two signals from two antennae can be processed at any given time, and hence while the transceiver 210 of FIG. 2B reduces size and/or cost, it also has more limited capabilities compared to the example of FIG. 2A. To enable the reduction of the number of components such as LNA 232, mixer 234, and ADC 236, an antenna switch module 241 routes received signals from one or two of antennae 111, 112, 113, 114 to the two receiver chains in RF transceiver. The switch module 241 can include one or more switches that can route signals received by one of the antennae 111, 112, 113, 114 to one receiver chain, or route signals received by any two of the antennae 111, 112, 113, 114 to both illustrated receiver chains. In one implementation, the antenna switch module 241 can include very fast switches that can allow for switching the receive antenna(e) with minimal effect on the receiver chain such as receiver chain 211. The controller can control the switch module 241 such that it can route the signal received by the appropriate antenna(e) to the receiver chains. It is understood that in the example illustrated in 2B, since each of antennae 111, 112, 113, 114 is located in a different location in the mobile device, there may be a different group delay for each antenna relative to the other antennae depending on the path length from each particular antenna to the receiver chain, where the group delay represents a time difference between a time of arrival of electrical signals on a conductive path connecting a given antenna to the receiver chain and a time of arrival of electrical signals on another conductive path connecting a different antenna with the same or different receiver chain.

With reference to FIGS. 1, 2A, and 2B, as discussed above, as the propagation paths from base station 120 to antennae change or the propagation characteristics of the propagation paths change, the mobile wireless device 110 can select which antenna, antennae pair, or plurality of antennae to activate for receiving the signals from base station based on the best antenna, antennae pair, or plurality of antennae will enable the baseband processor 242 to reconstruct the transmitted data. More particularly, controller 244 can periodically monitor the strength or other characteristics of signals received at antennae 111, 112, 113, 114 and can dynamically switch reception from a first antenna, a first antenna pair, or a first plurality of antennae to a second antenna, a second antenna pair, or a second plurality of antennae.

Figure 3A:
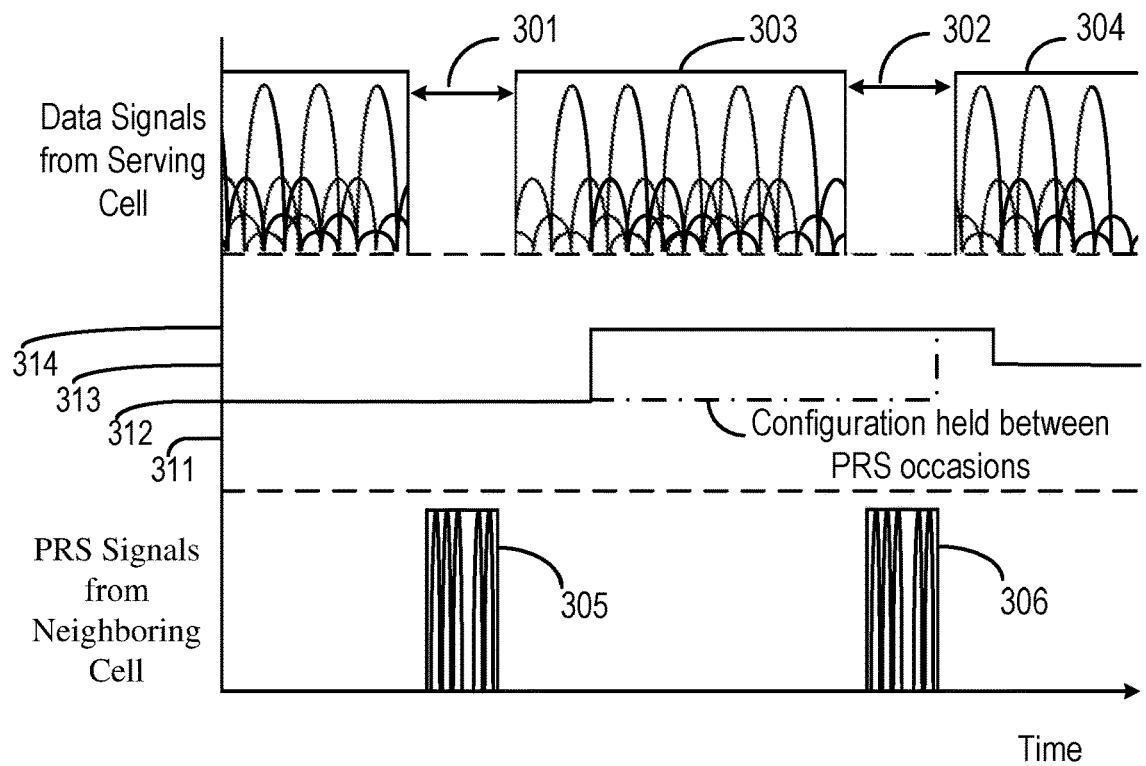
FIG. 3A illustrates one example of a MIMO configuration similar to that of FIG. 1 with periodic measurement gaps in data transmission from a serving cell to allow for measurement of positioning reference signals (PRS) signals periodically transmitted by neighboring cells.

FIG. 3A illustrates one example of a MIMO configuration similar to that of FIG. 1 with periodic measurement gaps in data transmission from a serving cell to allow for measurement of positioning reference signals (PRS) signals periodically transmitted by neighboring cells. As shown in FIG. 3A, data signals from a serving cell are transmitted over a period of time. Two measurement gaps, a first measurement gap 301 and a second measurement gap 302, are shown where the data transmitted by the serving cell is temporarily stopped in order to allow the mobile wireless device, such as the mobile wireless device 110 of FIG. 1, to measure a PRS signal transmitted by a neighbor cell. Such a measurement gap allows the transceiver, such as transceiver 210 of FIGS. 2A and 2B, to possibly tune away, in an example where the PRS measurement is to be an inter-frequency PRS neighbor measurement, from the carrier band used by the serving cell to a band or sub-band used by the neighboring cell for PRS signal transmission.

As discussed above with reference to FIG. 1, the mobile wireless device is capable of selecting an antenna, an antenna pair, or a plurality of antennae and dynamically changing said selection from time to time to enable an antenna configuration that allows for the best reconstruction by the mobile wireless device of the transmitted data signals, or more specifically by transceiver, modem, and/or a baseband processor of the mobile wireless device. In the illustrated scenario of FIG. 3A, there are four possible antenna configurations 311, 312, 313, 314, although it is understood that more antenna configurations are possible. For example, in an implementation with four possible antennae and where two antennae are to be selected at a time, it is understood that there could be six possible antenna pairs from which an antenna pair could be selected. Furthermore, it is understood that the configurations 311, 312, 313, 314 do not represent a magnitude of any particular parameter but are rather discrete levels representing an antenna configuration to allow comparison of a time at which an antenna configuration changes relative to transmission of data or transmission of a PRS (or other reference signal) signal.

As such, FIG. 3A illustrates a scenario where an antenna configuration of the mobile wireless device 110 (with reference to FIG. 1) has changed from a given configuration, illustrated as configuration 312, to configuration 314 during data transmission period 303. However, this could cause a difficulty for measuring PRS signals. As illustrated in FIG. 3A, in a first PRS measuring occasion 305, the antenna configuration of the mobile wireless device 110 was configuration 312. However, in a subsequent PRS measuring occasion 306, the antenna configuration had changed to configuration 314 which is different from configuration 312. The change from configuration 312 to configuration 314 is generally intended to improve the reception of data signals from the serving cell during data transmission period 303, but such a change may affect the accuracy of measurements of the PRS signal. This is because, in some scenarios, a first PRS occasion, such as occasion 305, can be used to determine certain antenna and/or receiver parameters such as a gain setting of the antenna(e) (which can include a characterization of each active antenna, for example, determining for each active antenna a gain offset). Such a PRS occasion can be referred to as a state determination occasion. Such antenna or receiver parameters are then used when actually measuring the PRS signal in a second PRS occasion, such as occasion 306. Such a PRS occasion can be referred to as a measurement occasion. However, in a situation such as the one shown in FIG. 3A, where the antenna configuration during the first occasion (state determination occasion), or example occasion 305, is different than the antenna configuration during the second occasion (measurement occasion), for example occasion 306, PRS measurements performed in the second occasion can be negatively impacted. In some situations, to counteract this, some solutions have been developed where a transceiver is configured to freeze the antenna configuration to the antenna configuration at the time of the state determination occasion, such as occasion 305, until the measurement occasion, such as occasion 306, so that the antenna configuration stays the same between both PRS occasions. Once the measurement occasion is finished, then the antenna configuration is allowed to change again. Such a solution is illustrated using dash-dot line illustrating that the antenna configuration is held constant from the beginning of occasion 305 until the end of occasion 306, at which time the antenna configuration is allowed to change again.

Figure 3B:
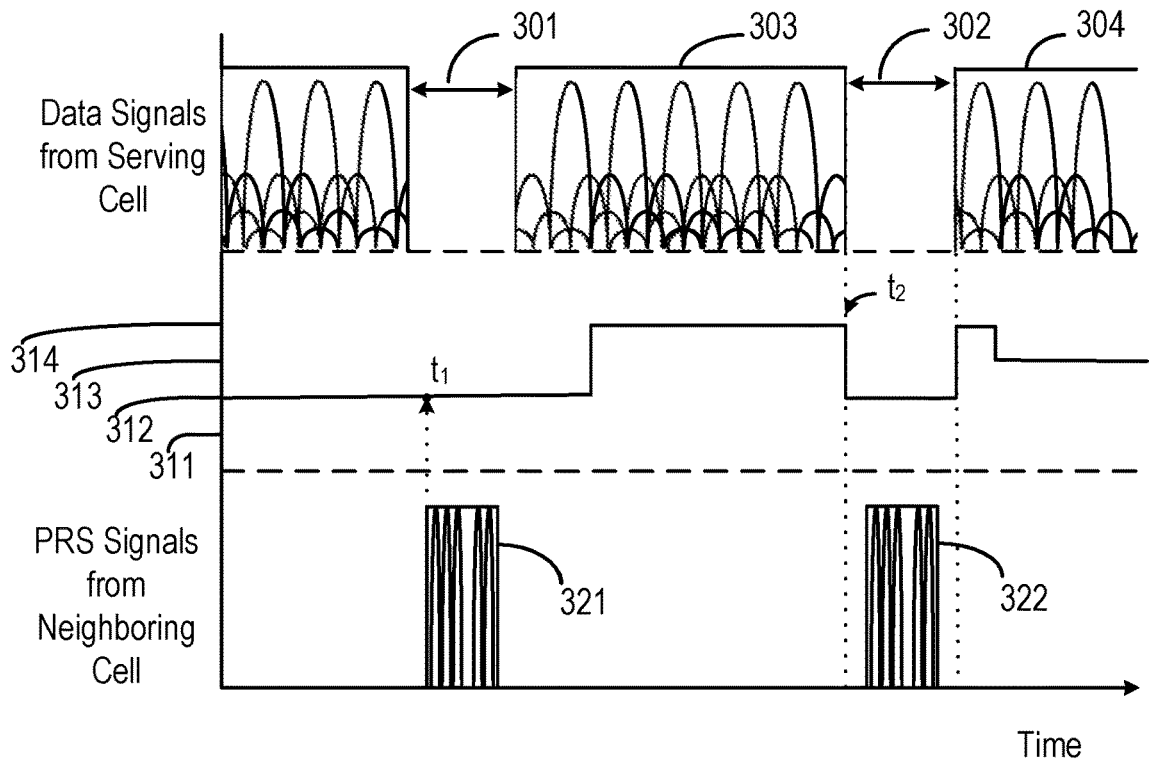
FIG. 3B illustrates an example similar to that of FIG. 3A, where an antenna configuration is switched to a previous antenna configuration right at or near the beginning of a PRS occasion.

FIG. 3B illustrates an example similar to that of FIG. 3A, where an antenna configuration is switched to a previous antenna configuration right at or near the beginning of a PRS occasion. Similar to the example shown in FIG. 3A, at the beginning of a first PRS occasion 321 at time t1, for example a state determination occasion, the antenna configuration was at configuration 312. Configuration 312 can be referred to as a first PRS occasion antenna configuration. This antenna configuration is saved in memory, for example a random access memory (RAM), of the mobile wireless device. Further, similar to FIG. 3A, the antenna configuration switched to configuration 314 during data transmission period 303. However, since the antenna configuration has changed between the first PRS occasion 321 and the second PRS occasion 322, the antenna configuration is switched back to configuration 312 for the duration of the second PRS occasion 322, for example a measurement occasion. Once the PRS occasion is complete, the antenna configuration is allowed to switch back to the pre-second-PRS-occasion antenna configuration, in the illustrated example, the antenna configuration is switched from a pre-second-PRS-occasion configuration 314 to configuration 312 extant at the time of the first PRS occasion and then at the end of, or after, the second PRS occasion, the antenna configuration is switched back to the pre-second-PRS-occasion configuration 314. In this way, the antenna configuration is the same between the first PRS occasion 321 and the second PRS occasion 322. In one example, the antenna configuration is the same between a state determination occasion and a measurement occasion.

While the discussion above has used the term "antenna configuration" in the context of which antenna(e) and/or antenna pair is used for data and/or for PRS measurement, it is understood that more generally, any change in an antenna parameter of the antenna, antenna(e), and/or antenna pair that could affect PRS measurements between a state determination occasion, such as a first reference signal occasion of a first RF transmitter, and a subsequent PRS occasion at which a PRS measurement will be taken (a measurement occasion), such as a second reference signal occasion of the first RF transmitter, can be understood to represent a change in the "antenna configuration." Hence, in one example where the antenna(e) and/or antenna pair are the same between the first reference signal occasion and the second reference signal occasion, but a gain setting has changed between the two reference signal occasions, such a change can be understood to be a change in the antenna configuration.

Figure 4:
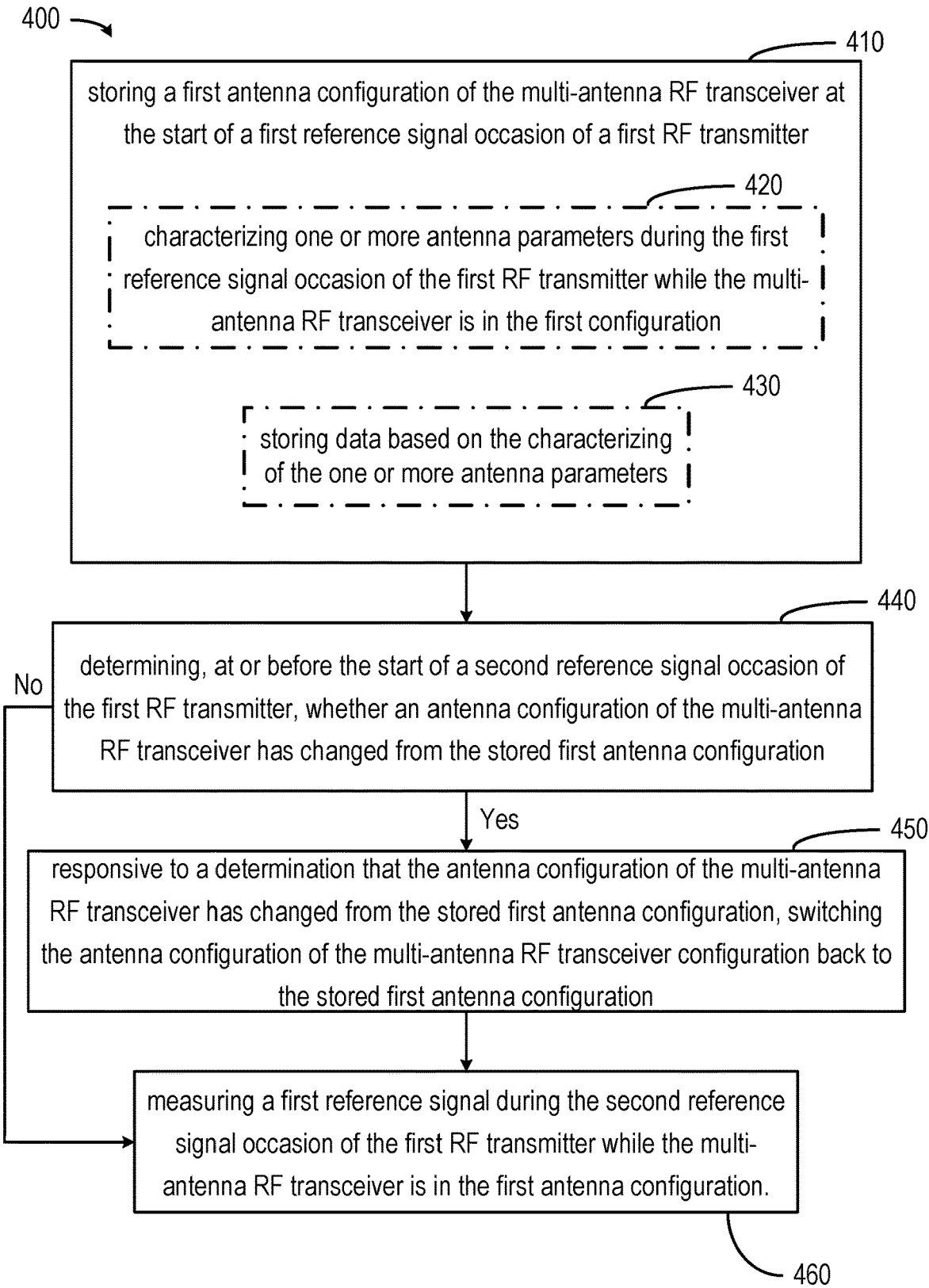
FIG. 4 illustrates a method 400 for performing a measurement of reference signals using a multi-antenna RF transceiver.

FIG. 4 illustrates a method 400 for performing a measurement of reference signals using a multi-antenna RF transceiver.

Method 400 begins at block 410 with storing a first antenna configuration of the multi-antenna RF transceiver at the start of a first reference signal occasion of a first RF transmitter. In one example, the start of the first reference signal occasion can correspond to time $t_1$ with reference to FIG. 3B. The antenna configuration can include an indication of which antenna, antenna pair, or plurality of antennae are activated at, for example, time $t_1$. In one example, the antenna(e) that are activated as indicated by the antenna configuration are fewer than a total number of antennae that the multi-antenna RF transceiver is capable of activating.

The antenna configuration may be stored in a memory location in communication with, for example, one or both of baseband processor 242 and controller 244 with reference to FIGS. 2A and 2B. Additionally or alternatively, the antenna configuration may be stored in a memory location such as memory 614 with reference to FIG. 6, with, in one example, such RAM location being allocated to a software program (running, for example, on processor 610 with reference to FIG. 6) maintaining a log of the antenna configuration for positioning purposes. Means for performing the functionality of block 410 can, but not necessarily, include, for example, antennae 111, 112, 113, 114, antenna switch module 241, baseband processor 242, and/or controller 244 with reference to FIG. 2B, and/or antenna(s) 602, wireless wide area network (WWAN) transceiver 604, processor 610, and/or memory 614 with reference to FIG. 6.

Block 410 of method 400 can include optional block 420, determining one or more antenna parameters during the first reference signal occasion while the multi-antenna RF transceiver is in the first antenna configuration. In one example, the one or more antenna parameters can include gain setting parameters for the antenna(e) indicated by the first antenna configuration as enabled. Hence, in one example, with reference to FIG. 3B, if the first antenna configuration is represented by antenna configuration 312, representing, for example, that antenna 111 and 112 (with reference to FIG. 2B) are enabled, determining the one or more antenna parameters during the first reference signal occasion can include determining gain settings parameters for each of antenna 111 and 112. Such gain settings, can include, for example digital gain settings for the baseband processor 242 and/or analog gain settings for LNA 232. Such gain settings can be used later when measuring the reference signal in a later, second reference signal occasion as described with reference to block 460. In other scenarios of such an example, characterizing one or more antenna parameters can include determining a path delay for each of antenna 111 and 112, which can include determining a time delay between, for example, a signal received at antenna 111 reaching the baseband processor 242 and a signal received at antenna 112 reaching the baseband processor 242. Additionally or alternatively, antenna parameters can include, with reference to FIG. 2B, settings for one or more low noise amplifiers such as LNA 232, settings associated with mixer 234, and/or settings for any other receiver chain components and/or component within baseband processor 242. Means for performing the functionality of block 420 can, but not necessarily, include, for example, antennae 111, 112, 113, 114, antenna switch module 241, baseband processor 242, and/or controller 244 with reference to FIG. 2B, and/or antenna(s) 602, WWAN transceiver 604, processor 610, and/or memory 614 with reference to FIG. 6.

Block 410 of method 400 can also include optional block 430, storing antenna parameter data based on the determined one or more antenna parameters. The stored antenna parameter data can then be used when measuring the reference signal at the second reference signal occasion as described below with reference to block 460. Means for performing the functionality of block 410 can, but not necessarily, include, for example, baseband processor 242 (which may include internal memory, not illustrated in FIG. 2B), and/or controller 244 (which may include internal memory, not illustrated in FIG. 2B) with reference to FIG. 2B, and/or processor 610 and/or memory 614 with reference to FIG. 6.

Method 400 continues at block 440 with determining, at or before the start of a second reference signal occasion of the first RF transmitter, whether an antenna configuration of the multi-antenna RF transceiver has changed from the stored first antenna configuration. The determination of whether the antenna configuration of the multi-antenna RF transceiver has changed from the stored first antenna configuration can occur at or before the start of the second reference signal occasion of the first RF transmitter, for example at time $t_2$ with reference to FIG. 3B. In general, such a determination should be made at a time sufficiently ahead of the time the reference signal is to be received by the RF transceiver to allow, in accordance with block 450, the antenna configuration to be switched to the stored first antenna configuration by the time the reference signal is received by the RF transceiver. As discussed with reference to FIG. 1, a multi-antenna RF transceiver may change, from time to time, which antenna(e) to activate for receiving signals based on propagation characteristics from a transmitter, such as a serving base station, to each of the antennae of the RF transceiver. Hence, in situations where an antenna configuration at or before the start of a second reference signal occasion is different from the antenna configuration of the multi-antenna RF transceiver during the first reference signal occasion, as noted above with reference to FIG. 3B, a reference signal measurement can be improved by switching the antenna configuration back to a first reference signal occasion antenna configuration. As such, in order to determine whether the current antenna configuration of the multi-antenna RF transceiver is to be switched to a different antenna configuration, as shown in block 440, the method 400 includes determining whether the antenna configuration of the multi-antenna RF transceiver has changed from the stored first antenna configuration. In one example the reference signal is a PRS signal, the first RF transmitter is a Long-Term Evolution (LTE) reference cell, and the first and the second reference signal occasions are a first PRS occasion and a second PRS occasion associated with the LTE reference cell. As shown by "No" arrow, if it is determined that the antenna configuration has not changed from the stored first antenna configuration, the method 400 proceeds to block 460. If it is determined that the antenna configuration has changed from the stored first antenna configuration, the method 400 proceeds to block 450 as shown by the "Yes" arrow. Means for performing the functionality of block 440 can, but not necessarily, include, for example, antenna switch module 241, baseband processor 242, and/or controller 244 with reference to FIG. 2B, and/or WWAN transceiver 604, processor 610, and/or memory 614 with reference to FIG. 6.

Method 400 continues at block 450 with, responsive to a determination that the antenna configuration of the multi-antenna RF transceiver has changed from the stored first antenna configuration, switching the multi-antenna RF transceiver configuration back to the stored first antenna configuration. With reference to FIG. 2B, in one example, the controller 244 can be capable of determining what the current antenna configuration is and/or switching the antenna configuration from a current antenna configuration to another antenna configuration. Hence, responsive to a determination, for example by the controller 244 (which could be a controller or processor of an RF transceiver, or a controller or processor of a mobile baseband modem that includes an RF transceiver or is in communication with an RF transceiver), that the antenna configuration of the multi-antenna RF transceiver has changed from the stored first antenna configuration, the controller 244, for example, can switch the antenna configuration of the multi-antenna RF transceiver back to the stored first antenna configuration. Switching the antenna configuration back to the stored first antenna configuration can include, for example controller 244, de-activating some antenna(e) while activating other antenna(e) such that a current antenna configuration matches the stored first antenna configuration. Additionally or alternatively, switching the antenna configuration back to the stored first antenna configuration can include restoring antenna settings and/or parameters to the antenna settings and/or parameters of the stored first antenna configuration. For example, in situations where the antenna(e) or antenna pair that are activated in the stored first antenna configuration and the second antenna configuration is or are the same, then switching the antenna configuration back to the stored first antenna configuration can include restoring antenna settings and/or parameters. In some implementations, switching the antenna configuration back to the stored first antenna configuration can include activation and de-activation of antennas as well as restoring antenna parameters. Switching the antenna configuration can additionally or alternatively include the controller 244 sending a signal to instruct and/or configure the antenna switch module 241 to route received signals from the enabled antenna(e) to the receiver chain 211. Means for performing the functionality of block 450 can, but not necessarily, include, for example, antenna(e) 111, 112, 113, 114, antenna switch module 241, baseband processor 242, and/or controller 244 with reference to FIG. 2B, and/or antenna(s) 602, WWAN transceiver 604, processor 610, and/or memory 614 with reference to FIG. 6.

Method 400 continues at block 460 with measuring a first reference signal during the second reference signal occasion of the first RF transmitter while the multi-antenna RF transceiver is in the first antenna configuration after having switched the antenna configuration of the multi-antenna RF transceiver back to the first antenna configuration at block 450. In one example, the reference signal is a PRS signal. With reference to FIG. 2B, in one example, measuring the first reference signal can include the baseband processor 242 obtaining timing information from the received first reference signal. To properly obtain the timing information contained in the, for example, PRS signal, measuring the first reference signal during the second reference signal occasion can including using the one or more antenna parameters determined in block 420 and/or the data stored in block 430, by, for example applying or setting a digital or analog gain for one or more components of the multi-antenna RF transceiver, for example, any combination of LNA 232, mixer 234, and/or components of the baseband processor 242 based on the one or more antenna parameters. In one example, the baseband processor 242 may include a DAGC component, where gain control settings are established for the proper function of the DAGC component. Since the antenna configuration is currently in the first antenna configuration (i.e., the same configuration of the multi-antenna RF transceiver during the first reference signal occasion) (whether being in the first antenna configuration is due to the configuration not having changed since the first reference signal occasion or being in the first antenna configuration is due to switching back to the first antenna configuration), the gain settings used when measuring the first reference signal at the second reference signal occasion can be set to the gain settings determined and stored during the first reference signal occasion, as described with reference to blocks 420 and 430. Additional gain settings that may also be determined in a first reference signal occasion and then restored, if needed, at a second reference signal occasion, can include an analog gain setting of, for example, a low noise amplifier or other component of the receiver chain, including BPF and/or mixers. Means for performing the functionality of block 460 can, but not necessarily, include, for example, antennae 111, 112, 113, 114, antenna switch module 241, LNA 232, mixer 234, baseband processor 242 and/or components of the baseband processor 242, ADC 236, and/or controller 244 with reference to FIG. 2B, and/or antenna(s) 602, WWAN transceiver 604, processor 610, and/or memory 614 with reference to FIG. 6.

With reference back to blocks 410 and 460, it is noted that the first reference signal comprises a PRS signal while the first RF transmitter is an LTE transmitter associated with a reference cell and/or a neighbor cell. Additionally or alternatively, the first reference signal occasion and the second reference signal occasion comprise PRS occasions in accordance with a PRS transmission schedule associated with the reference cell and/or neighbor cell, respectively.

Again, with reference to method 400, it is understood that the antenna configuration described above is in reference to a first RF transmitter. Where measurements of reference signals, for example, PRS signals, transmitted from, for example, a second RF transmitter are to be made, as described above with respect to reference signals transmitted by a first RF transmitter, it can be advantageous to use a same antenna configuration for a both a first reference signal occasion of the second RF transmitter (for example, a state determination occasion with respect to reference signals transmitted by the second RF transmitter) and a second reference signal occasion of the second RF transmitter (for example, a measurement occasion with respect to reference signals transmitted by the second RF transmitter). Hence, a plurality of antenna configurations, each antenna configuration corresponding to the antenna configuration at a first reference signal occasion associated with each RF transmitter for which reference signals are to be measured, may be determined and stored in memory in order to restore the antenna configuration to the stored antenna configuration for a second reference signal occasion associated with the each RF transmitter. Hence, in an example where blocks 410, 420 (optional), 430 (optional), 440, 450, and 460 are performed for measuring PRS signals transmitted from a reference cell (for example, a first RF transmitter), it is understood that the method 400 can also optionally include performing steps similar to those associated with blocks 410-460 for measuring reference signals transmitted from a second RF transmitter, for example, a neighboring cell to the reference cell. Such an example could include storing a second antenna configuration of the multi-antenna RF transceiver at the start of a first reference signal occasion of a second RF transmitter; optionally determining one or more antenna parameters during the first reference signal occasion of the second RF transmitter while the multi-antenna RF transceiver is in the second antenna configuration; optionally storing data based on the determined one or more antenna parameters; determining, before the start of a second reference signal occasion of the second RF transmitter, whether the antenna configuration of the multi-antenna RF transceiver has changed from the second antenna configuration; responsive to a determining that the antenna configuration of the multi-antenna RF transceiver has changed from the second antenna configuration, switching the antenna configuration of the multi-antenna RF transceiver back to the second antenna configuration; and measuring a second reference signal during the second reference signal occasion of the second RF transmitter while the multi-antenna RF transceiver is in the second antenna configuration. Therefore, in one particular example, where the first RF transmitter is an LTE transmitter associated with a reference cell and the second RF transmitter is an LTE transmitter associated with a neighbor cell to the reference cell, and the second reference signal is a PRS signal, it is understood that the first reference signal occasion of the first RF transmitter (i.e., reference cell) and the second reference signal occasion of the reference cell comprise PRS occasions in accordance with a PRS transmission schedule associated with the reference cell, and the first reference signal occasion of the second RF transmitter (i.e., neighbor cell) and the second reference signal occasion of the neighbor cell comprise PRS occasions in accordance with a PRS transmission schedule associated with the neighbor cell to the reference cell. Hence, more generally, for each RF transmitter, there are several aspects associated with the each RF transmitter, including a reference signal transmission schedule, a first and second reference signal occasion (for example, a state determination occasion and a measurement occasion associated with each RF transmitter), and an antenna configuration of the multi-antenna RF transceiver at the time of the first reference signal occasion, etc., that are associated with each RF transmitter. Generally, then, for each RF transmitter, at the second reference signal occasion, if the antenna configuration has changed since the first reference signal occasion, the antenna configuration can be switched back to the antenna configuration of the multi-antenna RF transceiver at the time of the first reference signal occasion for the each RF transmitter. While reference signals are transmitted according to schedules that can be specific to each RF transmitter, the reference signals can also include identification information to allow a wireless mobile device to determine the RF transmitter which transmitted the reference signal. It is understood that in the description above and also the description with respect to block 460, "first" reference signal and "second" reference signal may be very similar signals or similar kinds of signals, but are denoted as first reference signal and second reference signal to illustrate that one is transmitted at a different time and/or by a different transmitter than the other.

Figure 5A:
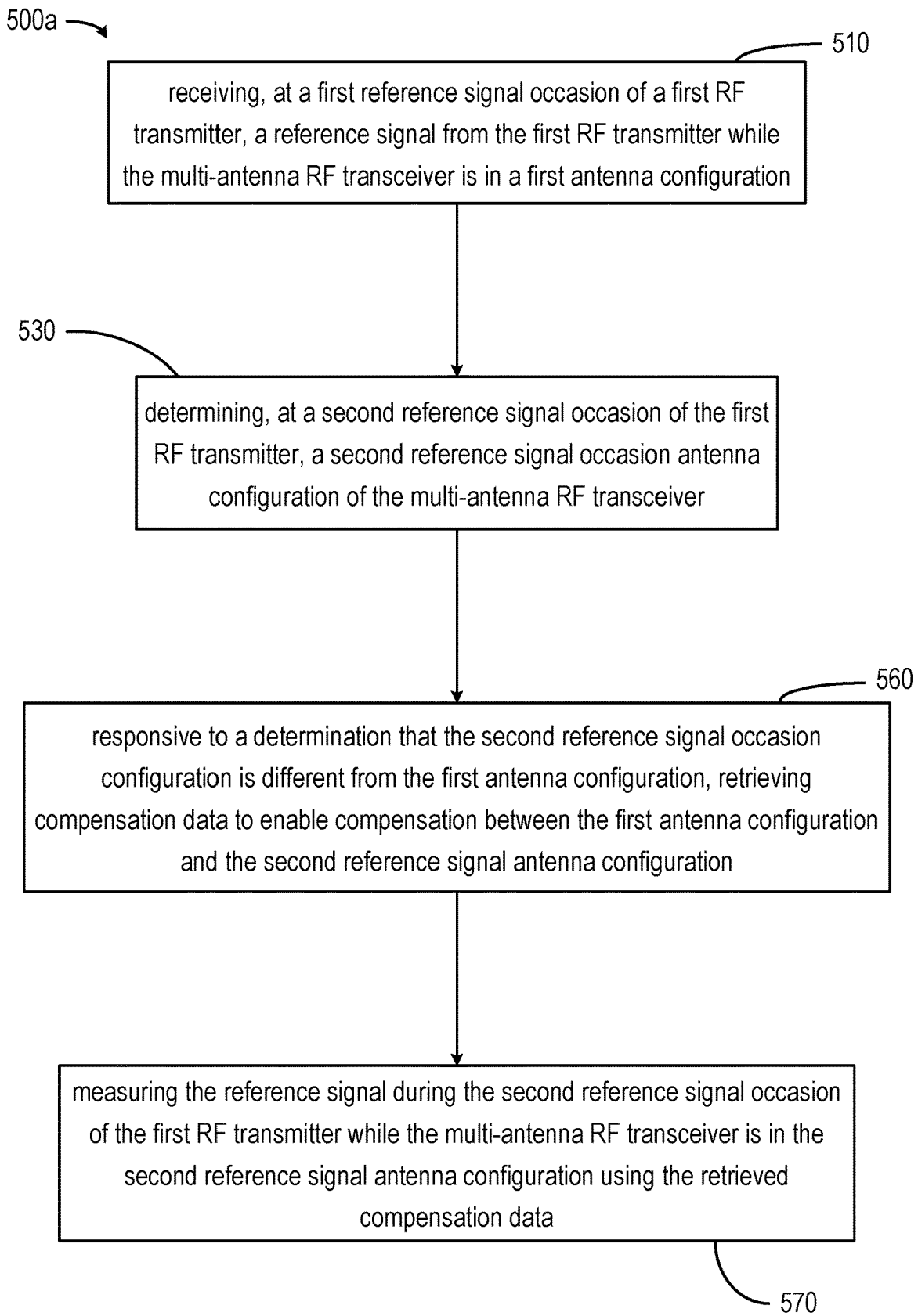
FIG. 5A illustrates another method for performing a measurement of reference signals using a multi-antenna RF transceiver.

FIG. 5A illustrates another method 500a for performing a measurement of reference signals using a multi-antenna RF transceiver. In the example of method 500a, the antenna configuration is not switched back to a first antenna configuration (the antenna configuration during a first reference signal occasion) at the second reference signal occasion, even if the antenna configuration has changed since the first reference signal occasion. Instead, the RF transceiver or a processor in the mobile device can compensate for differences in parameters between different antenna configurations.

Method 500a begins at block 510 with receiving, at a first reference signal occasion of a first RF transmitter, a reference signal from the first RF transmitter while the multi-antenna RF transceiver is in a first antenna configuration. With reference to FIGS. 3A and 3B, the first reference signal occasion of the first RF transmitter can correspond to occasion 305 and occasion 321. As shown in FIGS. 3A and 3B, the first antenna configuration is represented as configuration 312. Means for performing the functionality of block 510 can, but not necessarily, include, for example, antennae 111, 112, 113, 114, antenna switch module 241, LNA 232, mixer 234, baseband processor 242, ADC 236, and/or controller 244 with reference to FIG. 2B, and/or antenna(s) 602, WWAN transceiver 604, processor 610, and/or memory 614 with reference to FIG. 6.

Method 500a continues at block 530 with determining, at a second reference signal occasion of the first RF transmitter, a second reference signal occasion antenna configuration of the multi-antenna RF transceiver. With reference to FIG. 3A, the second reference signal occasion can correspond to occasion 306. As shown in FIG. 3A by the solid line, the second reference signal occasion antenna configuration of the multi-antenna RF transceiver is represented as configuration 314. Means for performing the functionality of block 530 can, but not necessarily, include, for example, antennae 111, 112, 113, 114, antenna switch module 241, baseband processor 242, and/or controller 244 with reference to FIG. 2B, and/or antenna(s) 602, WWAN transceiver 604, processor 610, and/or memory 614 with reference to FIG. 6.

Method 500a continues at block 560 with, responsive to a determination that the second reference signal occasion configuration is different from the first antenna configuration, retrieving compensation data to enable the multi-antenna RF transceiver to compensate between the first antenna configuration and the second reference signal antenna configuration. Different examples of compensation data, as is discussed further below, can include group delay difference between the first antenna configuration and the second reference signal occasion antenna configuration, antenna gain compensation between the first antenna configuration and the second reference signal occasion antenna configuration, etc. In various examples, the compensation data can be pre-programmed and/or otherwise stored in memory as a part of software running on a processor of the mobile device. Means for performing the functionality of block 560 can, but not necessarily, include, for example, baseband processor 242 and/or components of the baseband processor 242, and/or controller 244 with reference to FIG. 2B, and/or antenna(s) 602, WWAN transceiver 604, processor 610, and/or memory 614 with reference to FIG. 6.

Method 500a continues at block 570 with measuring the reference signal during the second reference signal occasion of the first RF transmitter while the multi-antenna RF transceiver is in the second reference signal antenna configuration using the retrieved compensation data. With reference again to FIG. 3B, the reference signal can be measured during the second reference signal occasion, for example occasion 322. However, unlike the example in FIG. 3B (where, in FIG. 3B the antenna configuration is switched at $t_2$ back to the first antenna configuration, configuration 312), in the implementation of block 570, the antenna configuration could remain the same as it was just before the second reference signal occasion began. Hence, in the implementation of block 570, unlike the example of FIG. 3B (where configurations are switched at $t_2$), at $t_2$ the configuration could remain at configuration 314. However, more generally, the second reference signal occasion antenna configuration is a configuration that happens to be the antenna configuration without changing the configuration solely or largely for the purpose of measuring the reference signal during the second reference signal occasion. Otherwise, for other purposes, such as to improve signal reception due to spatial diversity as described elsewhere herein, the antenna configuration can change. To make up for any differences between the antenna configuration during the first occasion, for example occasion 321, and the antenna configuration during the second occasion, for example occasion 322, the retrieved compensation data can be used while making the measurement. Hence, for example, timing differences between the two configurations (i.e., the first antenna configuration and the second reference signal occasion antenna configuration) could be used after the reference signal is received during the second reference signal occasion and after the signal is processed to compensate for any timing differences that could affect a timing measurement.

Additionally or alternatively, characterization of the two antenna configurations at a time close to the second reference signal occasion could be used to determine a compensation in gain setting between the two antenna configurations, and DAGC discussed above could then be adjusted according to compensation. In such an example, measuring the reference signal during the second reference signal occasion of the first RF transmitter while the multi-antenna RF transceiver is in the second reference signal antenna configuration using the retrieved compensation data can include compensating a gain setting in DAGC in an RF transceiver and/or modem. Means for performing the functionality of block 570 can, but not necessarily, include, for example, antennae 111, 112, 113, 114, antenna switch module 241, LNA 232, mixer 234, baseband processor 242 and/or components of baseband processor 242, ADC 236, and/or controller 244 with reference to FIG. 2B, and/or antenna(s) 602, WWAN transceiver 604, processor 610, and/or memory 614 with reference to FIG. 6.

Figure 5B:
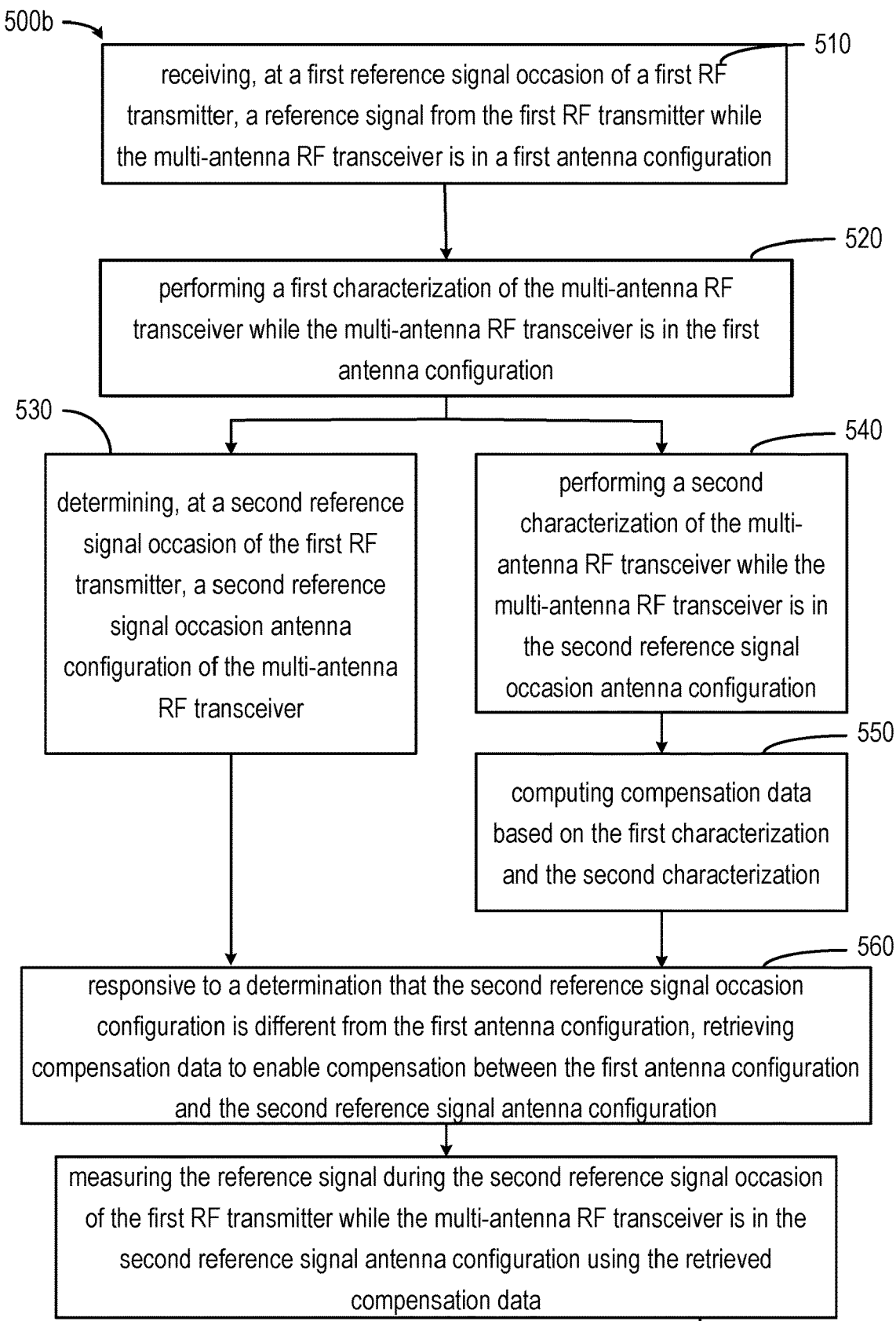
FIG. 5B illustrates another method for performing a measurement of reference signals using a multi-antenna RF transceiver that is similar to the method of FIG. 5A.

FIG. 5B illustrates another method 500b for performing a measurement of reference signals using a multi-antenna RF transceiver that is similar to method 500a of FIG. 5A. However, in method 500b, the multi-antenna RF transceiver is characterized to allow for computation of compensation data for performing the measurement of block 570.

In method 500b, blocks that are similar to blocks in method 500a are referred to using the same reference numerals. Hence method 500b moves from block 510 to block 520 with performing a first characterization of the multi-antenna RF transceiver while the multi-antenna RF transceiver is in the first antenna configuration. In one example, this characterization can be performed in the factory and/or prior to deployment of the mobile wireless device, such as mobile wireless device 110, in the field. Additionally or alternatively, this characterization can be performed in the field, however, while the multi-antenna RF transceiver is in the first antenna configuration but before block 510. In such an example, it is understood that block 520 can occur before block 510. In another implementation, block 520 can occur subsequent to block 510 or concurrent to block 510. Hence, in one example, while the multi-antenna RF is in the first antenna configuration and receiving the reference signal of block 510, or shortly after receiving the reference signal of block 510, the first characterization of block 520 can be performed. Means for performing the functionality of block 520 can, but not necessarily, include, for example, antennae 111, 112, 113, 114, antenna switch module 241, LNA 232, mixer 234, baseband processor 242 and/or components of baseband processor 242, ADC 236, and/or controller 244 with reference to FIG. 2B, and/or antenna(s) 602, WWAN transceiver 604, processor 610, and/or memory 614 with reference to FIG. 6.

Method 500b moves to block 530 and/or block 540 from block 520. Although block 530 and block 540 (as well as block 550) are shown as though occurring concurrent or in parallel, as discussed with block 510 and block 520, block 540 (as well as block 550) may occur before block 530, concurrent with block 530, or after block 530 in various implementations or situations. At block 540, the method 500b includes performing a second characterization of the multi-antenna RF transceiver while the multi-antenna RF transceiver is in the second reference signal occasion antenna configuration. Means for performing the functionality of block 540 can, but not necessarily, include, for example, antennae 111, 112, 113, 114, antenna switch module 241, LNA 232, mixer 234, baseband processor 242 and/or components of baseband processor 242, ADC 236, and/or controller 244 with reference to FIG. 2B, and/or antenna(s) 602, WWAN transceiver 604, processor 610, and/or memory 614 with reference to FIG. 6.

The first and second characterization of blocks 520 and 540 can be a characterization of the multi-antenna RF transceiver of a parameter that may differ between the antenna configuration during first reference signal occasion (i.e, the first antenna configuration) and the second reference signal occasion antenna configuration. In one example, parameter can represent a difference in path delay from an RF frontend to the baseband processor for the reference signal in the first antenna configuration compared to the second reference signal occasion configuration. Hence, for example, with reference to FIG. 2B, assuming one antenna configuration for receiving signals using an antenna pair of antenna 111 and antenna 112, a first propagation time from the time the signal is received by each of the antenna 111 and 112, passes through the antenna switch module 241, receive chain 211 (and second illustrated receive chain), and is received at the baseband processor 242 can be compared to a second propagation time associated with another antenna configuration. Hence, assuming the other antenna configuration for receiving signals uses an antenna pair of antenna 112 and antenna 113 (or antenna 113 and antenna 114), the second propagation time can include the time from when the signal is received by each of the antenna 112 and antenna 113 (or antenna 113 and antenna 114), passes through the antenna switch module 241, receive chain 211 (and second illustrated receive chain), and is received at the baseband processor 242. Because the placement of the antenna(e) in the mobile wireless device is different, the first propagation time and the second propagation time can be different. As such, the difference in path delay can be similar to the difference in the first propagation time and the second propagation time. Once the baseband processor 242 decodes a reference signal and determines a time based on the decoded reference signal, such a time can be compensated using such a difference in path delay.

In another example, a first gain setting for DAGC in a baseband processor for a first antenna configuration could be determined, for example, while the multi-antenna RF transceiver is in the first antenna configuration (which could be before, during, or after the first reference signal occasion). Later, when the antenna configuration changes to another antenna configuration, such as a second reference signal occasion antenna configuration, a second gain setting for DAGC in the baseband processor could be determined for the second reference signal occasion antenna configuration. If the first antenna configuration and the second reference signal occasion antenna configuration are each characterized (for example, at block 520 and/or block 540) with respect to gain settings, then compensation data could be computed based on the first characterizing and the second characterizing to adjust or compensate, for example, the gain setting for DAGC in the baseband processor, during the second reference signal occasion to allow the multi-antenna RF transceiver to measure the reference signal during the second reference signal occasion while keeping the antenna configuration unchanged from the second reference signal occasion antenna configuration.

Method 500b moves from block 540 to block 550 with computing compensation data based on the first characterization and the second characterization. The compensation data can relate to timing differences, gain differences, etc., between the first antenna configuration and the second reference signal occasion antenna configuration. Means for performing the functionality of block 550 can, but not necessarily, include, for example, baseband processor 242 and/or components of baseband processor 242, and/or controller 244 with reference to FIG. 2B, and/or WWAN transceiver 604, processor 610, and/or memory 614 with reference to FIG. 6.

Method 500b moves to block 560 and then block 570, which are similar to block 560 and block 570 discussed above with reference to method 500a of FIG. 5A. However, in the example of method 500b, the compensation data of block 560 and block 570 are computed in block 550 based on the first characterization of block 520 and the second characterization of block 540.

Figure 5C:
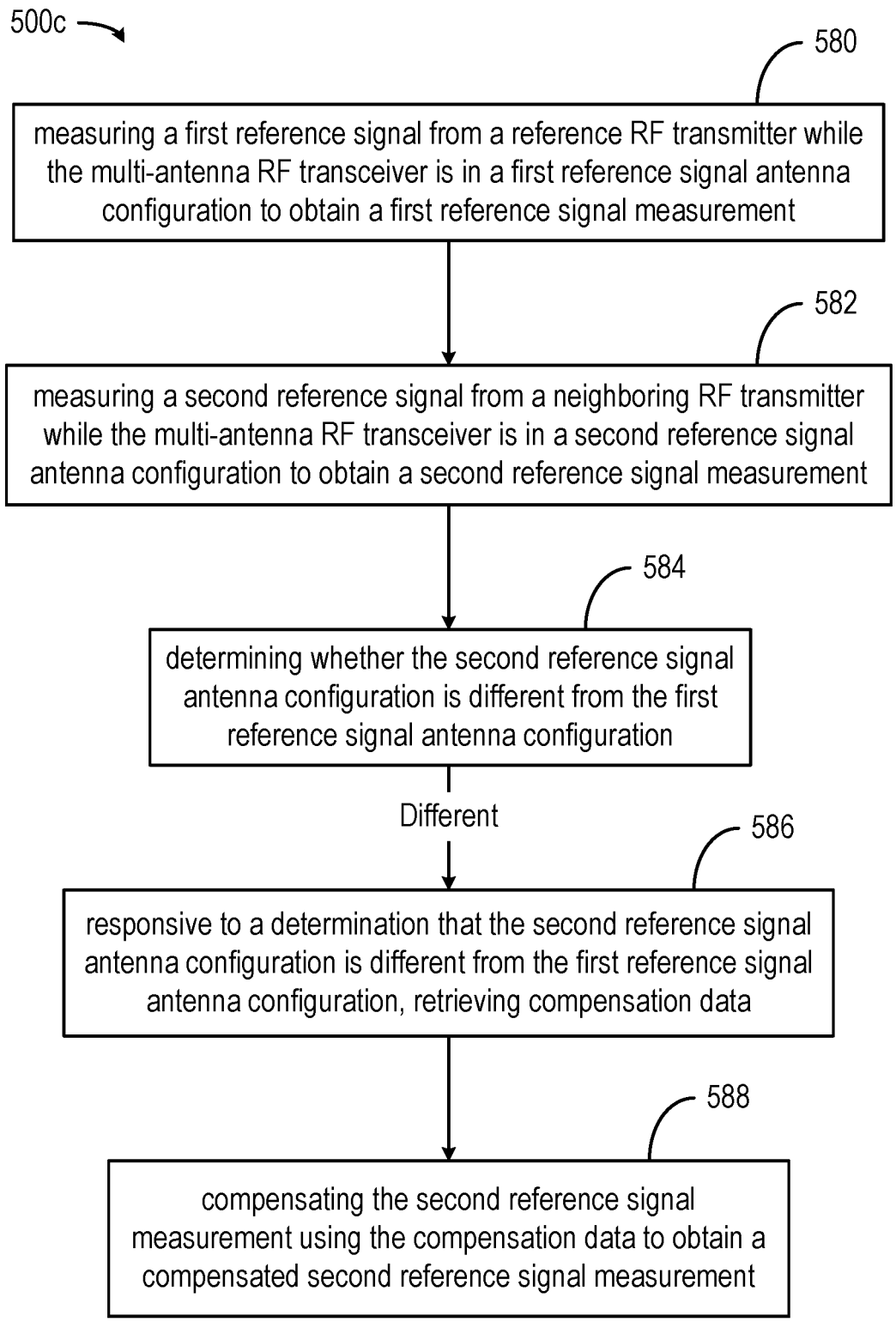
FIG. 5C illustrates yet another method for performing a measurement of reference signals using a multi-antenna RF transceiver that has some similarities to the methods of FIGS. 5A and 5B.

FIG. 5C illustrates another method 500c for performing a measurement of reference signals using a multi-antenna RF transceiver that is similar to methods 500a of FIG. 5A and 500b of FIG. 5B. However, in method 500c, a parameter is compensated while performing a final timing measurement between a reference cell and one or more neighboring cells. While some of the methods described earlier focus on changes in antenna configuration between a state determination occasion and a measurement occasion, FIG. 5C is aimed at compensating between an antenna configuration during a reference cell measurement occasion and during a neighbor cell measurement occasion. Hence, if the reference cell is measured during a reference cell measurement occasion (for example, a PRS occasion during which the mobile device makes timing measurements of a PRS signal of a reference cell) while the antenna configuration is in a first antenna configuration and the antenna configuration changes such that a neighbor cell (a cell that is a neighbor to a reference cell) is measured during a neighbor cell measurement occasion (for example, a PRS occasion during which the mobile device makes timing measurements of a PRS signal of a neighbor cell) while the antenna configuration is in a second antenna configuration different from the first antenna configuration, then method 500c involves compensating the measurement of reference signal transmitted by the neighbor cell to compensate for differences between the first antenna configuration and the second antenna configuration.

Method 500c begins at block 580 with measuring a first reference signal from a reference RF transmitter while the multi-antenna RF transceiver is in a first reference signal antenna configuration to obtain a first reference signal measurement. For example, the multi-antenna RF transceiver can receive the first reference signal and perform measurements on the received signal to obtain timing-related measurements on the first reference signal. In one example the timing-related measurements can be used to compute a reference signal time difference (RSTD) measurement between the first reference signal transmitted by the reference RF transmitter corresponding to a reference cell and the second reference signal transmitted by the neighbor or neighboring RF transmitter corresponding to a neighbor cell. As used herein, the first reference signal antenna configuration refers to whatever antenna configuration the multi-antenna RF transceiver was in when receiving and/or measuring the first reference signal. Furthermore, it is understood that the measuring of the first reference signal can occur, for example, in a measurement occasion of the reference RF transmitter. In some implementations, a state determination occasion of the reference RF transmitter may have already been used to determine gain and other settings of the reference RF transmitter as described elsewhere herein. Means for performing the functionality of block 580 can, but not necessarily, include, for example, antennae 111, 112, 113, 114, antenna switch module 241, baseband processor 242, and/or controller 244 with reference to FIG. 2B, and/or antenna(s) 602, WWAN transceiver 604, processor 610, and/or memory 614 with reference to FIG. 6.

Method 500c continues at block 582 with measuring a second reference signal from a neighboring RF transmitter while the multi-antenna RF transceiver is in a second reference signal antenna configuration to obtain a second reference signal measurement. For example, the multi-antenna RF transceiver can receive the second reference signal and perform measurements on the received signal to obtain timing-related measurements on the second reference signal. In one example the timing-related measurements can be used to compute an RSTD measurement between the reference RF transmitter and the neighboring RF transmitter. As used herein, the second reference signal antenna configuration refers to whatever antenna configuration the multi-antenna RF transceiver was in when receiving and/or measuring the second reference signal. Furthermore, it is understood that the measuring of the second reference signal can occur, for example, in a measurement occasion of the neighboring RF transmitter. In some implementations, a state determination occasion of the neighboring RF transmitter may have already been used to determine gain and other settings of the neighboring RF transmitter as described elsewhere herein. Means for performing the functionality of block 582 can, but not necessarily, include, for example, antennae 111, 112, 113, 114, antenna switch module 241, baseband processor 242, and/or controller 244 with reference to FIG. 2B, and/or antenna(s) 602, WWAN transceiver 604, processor 610, and/or memory 614 with reference to FIG. 6.

Method 500c continues at block 584 with determining whether the second reference signal antenna configuration is different from the first reference signal antenna configuration. In situations where the first reference signal antenna configuration is the same as the second reference signal antenna configuration, then compensation to overcome inaccuracies due solely to changes in antenna configuration may not be used, although it is understood that other kinds of compensation may be useful. However, if the first reference signal antenna configuration and the second signal antenna configuration are different, then compensation for the second signal antenna configuration can be useful. Means for performing the functionality of block 410 can, but not necessarily, include, for example, antenna switch module 241, baseband processor 242, and/or controller 244 with reference to FIG. 2B, and/or WWAN transceiver 604, processor 610, and/or memory 614 with reference to FIG. 6.

Method 500c continues at block 586 with, responsive to a determination that the second reference signal antenna configuration is different from the first reference signal antenna configuration, retrieving compensation data. In some examples, the compensation data may be stored in a non-volatile memory which is read by the processor at boot up and stored in, for example, a RAM memory accessible by the WWAN transceiver. Such compensation data can include, for example, a group delay between antenna configurations. For example, physical routing of signals received at the antenna(e) of the multi-antenna RF transceiver may mean that signals travel for a longer time, or a lesser time, before being processed and/or measured when the multi-antenna RF transceiver is in a given antenna configuration (for example, the first reference signal antenna configuration) compared to a length of time the signals travel when the multi-antenna RF transceiver is in another antenna configuration (for example, the second reference signal antenna configuration). This difference in time can be characterized by a positive or negative group delay between the antenna configurations. The compensation data retrieved in block 586 may be determined in the factory or the field as a part of a calibration procedure. If the calibration procedure is not intended to be repeated online (in the field), the calibration data may be stored in a non-volatile memory to allow it to be retrieved upon mobile device power up and stored locally where accessible by the WWAN transceiver. Additionally or alternatively, characterizations may be performed (as illustrated in blocks 520 and 540 of FIG. 5B) and compensation data computed (as illustrated in block 550 of FIG. 5B), for example, while reference signals are being received and/or measured at blocks 580 and 582. In one example, the compensation data can be determined online by measuring a certain cell in multiple different antenna configurations. If other sensor data, for example accelerometer data, indicates that the mobile device has not moved appreciably during the online compensation data calibration procedure, the measurements of the certain cell in the multiple different antenna configurations can be used to determine compensation data between different antenna configurations. Such data may then be stored until retrieved in a RAM memory accessible by the WWAN transceiver. Means for performing the functionality of block 586 can, but not necessarily, include, for example, baseband processor 242, and/or controller 244 with reference to FIG. 2B, and/or WWAN transceiver 604, processor 610, and/or memory 614 with reference to FIG. 6.

Method 500*c* continues at block 588 with compensating the second reference signal measurement using the compensation data to determine a compensated second reference signal measurement. In one example, the compensated second reference signal measurement can be used to determine a time difference between the first reference signal measurement and the compensated second reference signal measurement. For example, generally speaking, RSTD can be computed using the following equation:

$$\text{RSTD} = T_{SubframeRxNeighbor} - T_{SubframeRxReference}.$$

However, if $T_{SubframeRxReference}$ (determined as a part of block 580) is determined based on a first reference signal, such as a PRS signal transmitted by a reference cell, that was received while the multi-antenna RF transceiver was in a first antenna configuration (such as a first reference signal antenna configuration) while $T_{SubframeRxNeighbor}$ (determined as part of block 582) is determined based on a second reference signal, such as a PRS signal transmitted by a neighbor cell, that was received while the multi-antenna RF transceiver was in a second antenna configuration (such as a second reference signal antenna configuration), then if timing differences are introduced to the measurement because of groups delays that exist between the first and second antenna configuration, the accuracy of the RSTD measurement can be improved by compensating for the antenna configuration differences. Hence, accuracy can be improved by using a compensated timing measurement, for example, a $T_{SubframeRxNeighborComp}$ for computing the RSTD (which can be considered a compensated RSTD measurement). Such a compensated RSTD measurement can compensate for changes in antenna configurations between the reception of a reference signal of a reference cell and the reception of a reference signal of a neighbor cell. Hence, in one example of method 500*c*, an RSTD can be computed using the following equation:

$$\text{RSTD}_{Comp} = T_{SubframeRxNeighborComp} - T_{SubframeRxReference}.$$

It is understood that the issues related to changes in antenna configurations as it relates to methods 500*a* and 500*b* are with reference to a state determination occasion of a given cell (whether a reference cell or a neighbor cell) and a subsequent measurement occasion of the same cell. On the other hand, the issues related to changes in antenna configurations as it relates to method 500*c* are with reference to a measurement occasion of a reference cell and a measurement occasion of a neighbor cell. Hence, in some examples, methods 500*a* or 500*b* could be used in conjunction with method 500*c*. That is to say, for a given set of measurements, methods 500*a* or 500*b* could be used to mitigate negative consequences of antenna configuration changes between state determination and measurement occasions (of a same cell), and, in some implementations, additionally, method 500*c* could be used to mitigate the negative consequences of antenna configuration changes between the measurement occasion of a reference cell and the measurement occasion of a neighbor cell. Means for performing the functionality of block 588 can, but not necessarily, include, for example, baseband processor 242, and/or controller 244 with reference to FIG. 2B, and/or WWAN transceiver 604, processor 610, and/or memory 614 with reference to FIG. 6.

Figure 6:
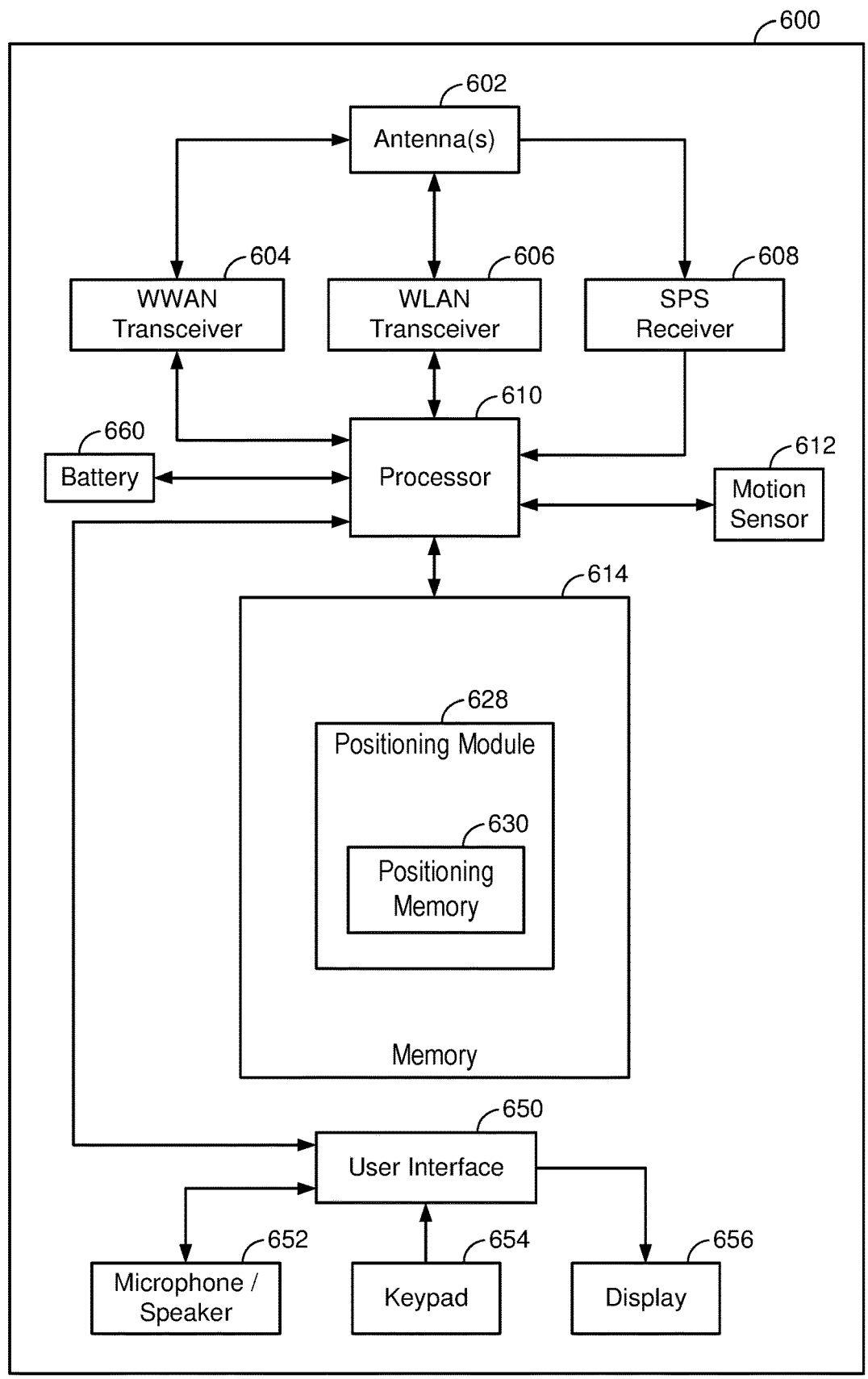
FIG. 6 illustrates an exemplary mobile device that may be used to determine position based on reference signal measurements as described above with reference to the methods of FIGS. 4, 5A, 5B, and 5C.

FIG. 6 illustrates an exemplary mobile device, for example mobile wireless device 110 with reference to FIG. 1, that may be used to determine position based on reference signal measurements as described above with reference to the methods of FIGS. 4, 5A, 5B, and 5C. In one example, mobile device 600 includes or incorporates an apparatus for performing a measurement of reference signals using a multi-antenna RF transceiver. FIG. 6 is a block diagram illustrating various components of an exemplary mobile device 600. For the sake of simplicity, the various features and functions illustrated in the box diagram of FIG. 6 are connected together using a common bus, which is meant to represent that these various features and functions are operatively coupled together. Those skilled in the art will recognize that other connections, mechanisms, features, functions, or the like, may be provided and adapted as necessary to operatively couple and configure an actual mobile wireless device. Further, it is also recognized that one or more of the features or functions illustrated in the example of FIG. 6 may be further subdivided or two or more of the features or functions illustrated in FIG. 6 may be combined.

The mobile device 600 may include one or more WWAN transceiver(s) 604, which can correspond, for example, to RF transceiver 210 with reference to FIGS. 2A and 2B, that may be connected to one or more antennas 602, which can correspond, for example, to antenna 111, 112, 113, 114 of FIGS. 2A and 2B. As such, the illustrated WWAN transceiver(s) 604 can include a multi-antenna RF transceiver. The WWAN transceiver 604 comprises suitable devices, hardware, and/or software for communicating with and/or detecting signals to/from WWAN access points (such as, for example base station 120 and Neighbor cell of FIGS. 1, 2A, and 2B) and/or directly with other wireless devices within a network. In one aspect, the WWAN transceiver 604 may comprise a Code Division Multiple Access (CDMA) communication system suitable for communicating with a CDMA network of wireless base stations; however in other aspects, the wireless communication system may comprise another type of cellular telephony network, such as, for example, TDMA, LTE, or Global System for Mobile Communications (GSM). Additionally, any other type of wide area wireless networking technologies may be used, for example, WiMAX (IEEE 802.16), etc. The mobile device 600 may also include one or more wireless local area network (WLAN) transceivers (such as illustrated WLAN transceiver 606) that may be connected to one or more antennas 602. The WWAN transceiver 604, alone or with processor 610, can be configured to make timing measurements based on received reference signals from RF transmitters to determine the mobile device's 600 position as discussed above with reference to FIGS. 4, 5A, 5B, and 5C. The WLAN transceiver 606 comprises suitable devices, hardware, and/or software for communicating with and/or detecting signals to/from WLAN access points and/or directly with other wireless devices within a network. In one aspect, the WLAN transceiver 606 may comprise a Wi-Fi (IEEE 802.11x) communication system suitable for communicating with one or more wireless access points; however, in other aspects, the WLAN transceiver 606 comprise another type of local area network or personal area network (PAN). Additionally, any other type of wireless networking technologies may be used, for example, Ultra Wide Band, Bluetooth, ZigBee, wireless USB, etc. It is understood that while much of the discussion regarding making timing measurements based on received reference signals from RF transmitters to determine the mobile device's 600 position discussed above has been with reference to WWAN transceiver 604, however, in some examples, WLAN transceiver 606 may be involved in the timing measurements as described with reference to FIGS. 4, 5A, 5B, and 5C.

A satellite positioning system (SPS) receiver 608 may also be included in the mobile device 600. The SPS receiver 608 may be connected to the one or more antennas 602 for receiving satellite signals. The SPS receiver 608 may comprise any suitable hardware and/or software for receiving and processing SPS signals. The SPS receiver 608 requests information and operations as appropriate from the other systems and performs the calculations for determining the mobile device's 600 position using measurements obtained by any suitable SPS algorithm.

A motion sensor 612 may be coupled to a processor 610 to provide movement and/or orientation information, which is independent of motion data derived from signals, received by the WWAN transceiver 604, the WLAN transceiver 606 and the SPS receiver 608.

By way of example, the motion sensor 612 may utilize an accelerometer (e.g., a microelectromechanical systems device), a gyroscope, a geomagnetic sensor (e.g., a compass), an altimeter (e.g., a barometric pressure altimeter), and/or any other type of movement detection sensor. Moreover, the motion sensor 612 may include a plurality of different types of devices and combine their outputs in order to provide motion information. For example, the motion sensor 612 may use a combination of a multi-axis accelerometer and orientation sensors to provide the ability to compute positions in 2-D and/or 3-D coordinate systems.

The processor 610 may be connected to the WWAN transceiver 604, WLAN transceiver 606, the SPS receiver 608 and the motion sensor 612. The processor 610 may include one or more microprocessors, microcontrollers, and/or digital signal processors that provide processing functions, as well as other calculation and control functionality. The processor 610 may also include memory 614 for storing data and software instructions for executing programmed functionality within the mobile device 600. The memory 614 may be on-board the processor 610 (e.g., within the same integrated circuit package), and/or the memory may be external memory to the processor and functionally coupled over a data bus. The functional details associated with aspects of the disclosure will be discussed in more detail below.

A number of software modules and data tables may reside in memory 614 and be utilized by the processor 610 in order to manage both communications and positioning determination functionality. As illustrated in FIG. 6, memory 614 may include and/or otherwise receive a positioning module 628. One should appreciate that the organization of the memory contents as shown in FIG. 6 is merely exemplary, and as such the functionality of the modules and/or data structures may be combined, separated, and/or be structured in different ways depending upon the implementation of the mobile device 600. Furthermore, in one embodiment, a battery 660 may be coupled to the processor 610, wherein the battery 660 may supply power to the processor 610 and various other modules and components located on the mobile device 600 through appropriate circuitry and/or under control of the processor 610.

The positioning module 628 can be capable of determining a position based on inputs from wireless signal measurements from the WWAN transceiver 604, signal measurements from the WLAN transceiver 606, data received from the SPS receiver 608, and/or data from the motion sensor 612. The positioning module 628 can also include, or have access to, positioning memory 630 in memory 614 for storing a first antenna configuration in accordance with block 410 of FIG. 4, storing data based on characterizing one or more antenna parameters in accordance with block 430 of FIG. 4, retrieving compensation data in accordance with block 560 of FIG. 5A, storing the compensation data computed in accordance with block 550 of FIG. 5B, retrieving compensation data in accordance with block 586 of FIG. 5C. Other memory which can be used for this purpose can include memory local to the processor 610 or even memory local to the RF transceiver 210 (with reference to FIGS. 2A and 2B), such as memory local to baseband processor 242, where the RF transceiver 210 can be included WWAN transceiver 604.

While the modules shown in FIG. 6 are illustrated in the example as being contained in the memory 614, it is recognized that in certain implementations such procedures may be provided for or otherwise operatively arranged using other or additional mechanisms. For example, all or part of the positioning module 628 may be provided in firmware. Also, some aspects of positioning module 628 may be performed in WWAN transceiver 604.

In many embodiments, the memory 614 can include many different kinds of memory and is only illustrated schematically. Memory 614 can include a non-transitory computer readable medium, which may include a read-only memory (ROM) device. The memory 614 may comprise software elements, including an operating system, device drivers, executable libraries, and/or other code, such as the illustrated navigation application 718. The navigation application can comprise one or more computer programs provided by various embodiments, and/or may be designed to implement methods, and/or configure systems, provided by other embodiments, as described herein, for example, with reference to FIGS. 4, 5A, 5B, 5C. Merely by way of example, one or more procedures described with respect to the method(s) discussed above might be implemented as code and/or instructions executable by a computer (and/or a processor within a computer), in an aspect, then, such code and/or instructions may be used to configure and/or adapt a general purpose computer (or other device) to perform one or more operations in accordance with the described methods.

As described elsewhere in greater detail, such instructions stored on a non-transitory computer readable medium for execution by one or more processors of a mobile device may, in various implementations, include instructions to perform operations corresponding to any of the functions disclosed herein, for example those illustrated in FIGS. 4, 5A, 5B, 5C, the operations comprising, for example, blocks 410, 420, 430, 440, 450, and 460 of FIG. 4; blocks 510, 530, 560, and 570 of FIG. 5A; blocks 510, 520, 530, 540, 550, 560, and 570 of FIG. 5B; and blocks 580, 582, 584, 586, and 588 of FIG. 5C.

The mobile device 600 may include a user interface 650, which provides any suitable interface systems, such as a microphone/speaker 652, keypad 654, and display 656 that allows user interaction with the mobile device 600. The microphone/speaker 652 provides for voice communication services using the WWAN transceiver 604 and/or the WLAN transceiver 606. Although illustrated as a single device, it is understood that microphone/speaker 652 may comprise a separate microphone device and a separate speaker device. The keypad 654 comprises any suitable buttons for user input. The display 656 comprises any suitable display, such as, for example, a liquid crystal display, and may further include a touchscreen display for additional user input modes. The user interface 650 is illustrated as a hardware user interface 650, however, can also be understood to include a graphical user interface displayed on a touchscreen allowing output to a user and receipt of input from the user. Input from, and output to, user can be mediated through the user interface 650 such that the mobile device, for example the processor 610 or other components, can receive user input from the user interface 650 and provide output to the user to the user interface 650.

The processor 610 may include any form of logic suitable for performing at least the techniques provided herein, for example any of the methods described with reference to FIGS. 4, 5A, and 5B. For example, the processor 610 (which may include one or more processors within the mobile device 600) can be coupled to the memory 614, user interface (including, for example, keypad 654, display 656, microphone/speaker 652, or a combination thereof), positioning module 628, and the wireless transceiver (such as WWAN transceiver 604 and/or WLAN transceiver 606). The one or more processors and the memory can together be configured to, for example, based on instructions in the memory 614 perform any of the aspects of method 400, 500a, and/or 500b described above with reference to FIGS. 4, 5A, and 5B. More particularly, one or more processors (such as processor 610 and/or a controller or processor within WWAN transceiver 604, with reference to FIGS. 2A and 2B, baseband processor 242 and/or controller 244) coupled to the memory 614 can together configured to perform various aspects of the methods described with reference to FIGS. 4, 5A, and 5B. Memory 614 can, in some embodiments, include both volatile and non-volatile memory. In one embodiment, retaining the first route data in the memory 614 includes retaining the first route data in a non-volatile memory.

As used herein, the mobile device 600 may be any portable or movable device or machine that is configurable to acquire wireless signals transmitted from, and transmit wireless signals to, one or more wireless communication devices or networks. As shown in FIG. 6, the mobile device 600 may be representative of such a mobile wireless device. Thus, by way of example but not limitation, the mobile device 600 may include a radio device, a cellular telephone device, a computing device, a personal communication system (PCS) device, or other like movable wireless communication equipped device, appliance, or machine. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. A "mobile device" is also intended to include any device that receives and measures, for example, a timing of reference signals transmitted by RF transmitter for determining the position of the mobile device. Any operable combination of the above is also considered a "mobile device."

As used herein, the term "wireless device" may refer to any type of wireless communication device, which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

What is claimed is:

1. A method for performing a measurement of reference signals using a multi-antenna radio frequency (RF) transceiver, the method comprising:
   storing a first antenna configuration of the multi-antenna RF transceiver at the start of a first reference signal occasion of a first RF transmitter;
   determining, at or before the start of a second reference signal occasion of the first RF transmitter, whether an antenna configuration of the multi-antenna RF transceiver has changed from the stored first antenna configuration;
   responsive to a determination that the antenna configuration of the multi-antenna RF transceiver has changed from the stored first antenna configuration, switching the antenna configuration of the multi-antenna RF transceiver back to the stored first antenna configuration; and
   measuring a first reference signal during the second reference signal occasion of the first RF transmitter while the multi-antenna RF transceiver is in the first antenna configuration.

2. The method of claim 1, further comprising:
   determining one or more antenna parameters during the first reference signal occasion of the first RF transmitter while the multi-antenna RF transceiver is in the first antenna configuration; and
   storing antenna parameter data based on the determined one or more antenna parameters.

3. The method of claim 2, wherein measuring the first reference signal during the second reference signal occasion of the first RF transmitter while the multi-antenna RF transceiver is in the first antenna configuration comprises setting a digital or analog gain for one or more components of the multi-antenna RF transceiver based on the one or more antenna parameters.

4. The method of claim 1, wherein
   the first reference signal comprises a positioning reference signal (PRS),
   the first RF transmitter is a Long-Term Evolution (LTE) transmitter associated with a reference cell, and
   the first reference signal occasion and the second reference signal occasion comprise PRS occasions in accordance with a PRS transmission schedule associated with the reference cell.

5. The method of claim 1, further comprising:
storing a second antenna configuration of the multi-antenna RF transceiver at the start of a first reference signal occasion of a second RF transmitter;
determining one or more antenna parameters during the first reference signal occasion of the second RF transmitter while the multi-antenna RF transceiver is in the second antenna configuration;
determining, before the start of a second reference signal occasion of the second RF transmitter, whether an antenna configuration of the multi-antenna RF transceiver has changed from the second antenna configuration;
responsive to a determination that the antenna configuration of the multi-antenna RF transceiver has changed from the second antenna configuration, switching the antenna configuration of the multi-antenna RF transceiver back to the second antenna configuration; and
measuring a second reference signal during the second reference signal occasion of the second RF transmitter while the multi-antenna RF transceiver is in the second antenna configuration.

6. The method of claim 5, wherein
the second reference signal comprises a positioning reference signal (PRS),
the first RF transmitter is a Long-Term Evolution (LTE) transmitter associated with a reference cell,
the second RF transmitter is an LTE transmitter associated with a neighbor cell to the reference cell,
the first reference signal occasion of the reference cell and the second reference signal occasion of the reference cell comprise PRS occasions in accordance with a PRS transmission schedule associated with the reference cell, and
the first reference signal occasion of the neighbor cell and the second reference signal occasion of the neighbor cell comprise PRS occasions in accordance with a PRS transmission schedule associated with the neighbor cell to the reference cell.

7. A mobile device comprising:
a multi-antenna radio frequency (RF) transceiver;
a memory; and
one or more processors coupled to the memory and the multi-antenna radio frequency (RF) transceiver, the one or more processors configured to:
store, in the memory, a first antenna configuration of the multi-antenna RF transceiver at the start of a first reference signal occasion of a first RF transmitter;
determine, at or before the start of a second reference signal occasion of the first RF transmitter, whether an antenna configuration of the multi-antenna RF transceiver has changed from the first antenna configuration stored in the memory;
responsive to a determination that the antenna configuration of the multi-antenna RF transceiver has changed from the stored first antenna configuration, switch the antenna configuration of the multi-antenna RF transceiver back to the first antenna configuration stored in the memory; and
measure a first reference signal during the second reference signal occasion of the first RF transmitter while the multi-antenna RF transceiver is in the first antenna configuration.

8. The mobile device of claim 7, the one or more processors and the memory further configured to:
determine one or more antenna parameters during the first reference signal occasion of the first RF transmitter while the multi-antenna RF transceiver is in the first antenna configuration; and
store, in the memory, antenna parameter data based on the determined one or more antenna parameters.

9. The mobile device of claim 8, wherein the one or more processors and the memory configured to measure the first reference signal during the second reference signal occasion of the first RF transmitter while the multi-antenna RF transceiver is in the first antenna configuration comprises the one or more processors configured to set a digital or analog gain for one or more components of the multi-antenna RF transceiver based on the one or more antenna parameters.

10. The mobile device of claim 7, wherein
the first reference signal comprises a positioning reference signal (PRS),
the first RF transmitter is a Long-Term Evolution (LTE) transmitter associated with a reference cell, and
the first reference signal occasion and the second reference signal occasion comprise PRS occasions in accordance with a PRS transmission schedule associated with the reference cell.

11. The mobile device of claim 7, the one or more processors and the memory further configured to:
store, in the memory, a second antenna configuration of the multi-antenna RF transceiver at the start of a first reference signal occasion of a second RF transmitter;
determine one or more antenna parameters during the first reference signal occasion of the second RF transmitter while the multi-antenna RF transceiver is in the second antenna configuration;
determine, at or before the start of a second reference signal occasion of the second RF transmitter, whether an antenna configuration of the multi-antenna RF transceiver has changed from the second antenna configuration;
responsive to a determination that the antenna configuration of the multi-antenna RF transceiver has changed from the second antenna configuration, switching the antenna configuration of the multi-antenna RF transceiver back to the second antenna configuration stored in the memory; and
measuring a second reference signal during the second reference signal occasion of the second RF transmitter while the multi-antenna RF transceiver is in the second antenna configuration.

12. The mobile device of claim 11, wherein
the second reference signal comprises a positioning reference signal (PRS),
the first RF transmitter is a Long-Term Evolution (LTE) transmitter associated with a reference cell,
the second RF transmitter is an LTE transmitter associated with a neighbor cell to the reference cell,
the first reference signal occasion of the reference cell and the second reference signal occasion of the reference cell comprise PRS occasions in accordance with a PRS transmission schedule associated with the reference cell, and
the first reference signal occasion of the neighbor cell and the second reference signal occasion of the neighbor cell comprise PRS occasions in accordance with a PRS transmission schedule associated with the neighbor cell to the reference cell.

13. An apparatus for performing a measurement of reference signals using a multi-antenna radio frequency (RF) transceiver, the apparatus comprising:

means for storing a first antenna configuration of the multi-antenna RF transceiver at the start of a first reference signal occasion of a first RF transmitter;

means for determining, at or before the start of a second reference signal occasion of the first RF transmitter, whether an antenna configuration of the multi-antenna RF transceiver has changed from the stored first antenna configuration;

means for, responsive to a determination that the antenna configuration of the multi-antenna RF transceiver has changed from the stored first antenna configuration, switching the antenna configuration of the multi-antenna RF transceiver back to the stored first antenna configuration; and means for measuring a first reference signal during the second reference signal occasion of the first RF transmitter while the multi-antenna RF transceiver is in the first antenna configuration.

14. The apparatus of claim 13, further comprising:
means for determining one or more antenna parameters during the first reference signal occasion of the first RF transmitter while the multi-antenna RF transceiver is in the first antenna configuration; and
means for storing antenna parameter data based on the determined the one or more antenna parameters.

15. The apparatus of claim 14, wherein the means for measuring the first reference signal during the second reference signal occasion of the first RF transmitter while the multi-antenna RF transceiver is in the first antenna configuration comprises means for setting a digital or analog gain for one or more components of the multi-antenna RF transceiver based on the one or more antenna parameters.

16. The apparatus of claim 13, wherein
The first reference signal comprises a positioning reference signal (PRS),
the first RF transmitter is a Long-Term Evolution (LTE) transmitter associated with a reference cell, and
the first reference signal occasion and the second reference signal occasion comprise PRS occasions in accordance with a PRS transmission schedule associated with the reference cell.

17. The apparatus of claim 13, further comprising:
means for storing a second antenna configuration of the multi-antenna RF transceiver at the start of a first reference signal occasion of a second RF transmitter;
means for determining one or more antenna parameters during the first reference signal occasion of the second RF transmitter while the multi-antenna RF transceiver is in the second antenna configuration;
means for determining, before the start of a second reference signal occasion of the second RF transmitter, whether an antenna configuration of the multi-antenna RF transceiver has changed from the second antenna configuration;
means for, responsive to a determination that the antenna configuration of the multi-antenna RF transceiver has changed from the second antenna configuration, switching the antenna configuration of the multi-antenna RF transceiver back to the second antenna configuration; and
means for measuring a second reference signal during the second reference signal occasion of the second RF transmitter while the multi-antenna RF transceiver is in the second antenna configuration.

18. The apparatus of claim 17, wherein
the second reference signal comprises a positioning reference signal (PRS),
the first RF transmitter is a Long-Term Evolution (LTE) transmitter associated with a reference cell,
the second RF transmitter is an LTE transmitter associated with a neighbor cell to the reference cell,
the first reference signal occasion of the reference cell and the second reference signal occasion of the reference cell comprise PRS occasions in accordance with a PRS transmission schedule associated with the reference cell, and
the first reference signal occasion of the neighbor cell and the second reference signal occasion of the neighbor cell comprise PRS occasions in accordance with a PRS transmission schedule associated with the neighbor cell to the reference cell.

19. A method for performing a measurement of reference signals using a multi-antenna radio frequency (RF) transceiver capable of receiving signals when in one of a plurality of configurations, the method comprising:
measuring a first reference signal from a reference RF transmitter while the multi-antenna RF transceiver is in a first reference signal antenna configuration to obtain a first reference signal measurement;
measuring a second reference signal from a neighboring RF transmitter while the multi-antenna RF transceiver is in a second reference signal antenna configuration to obtain a second reference signal measurement;
determining whether the first reference signal antenna configuration is different from the second reference signal antenna configuration;
responsive to a determination that the second reference signal antenna configuration is different from the first reference signal antenna configuration, retrieving compensation data; and
compensating the second reference signal measurement using the compensation data to obtain a compensated second reference signal measurement.

20. The method of claim 19, wherein the first reference signal and the second reference signal comprise positioning reference signal (PRS).

21. The method of claim 20, wherein the first reference signal measurement and the compensated second reference signal measurement comprise timing measurements.

22. The method of claim 21, wherein the compensation data includes a group delay between the first reference signal antenna configuration and the second reference signal antenna configuration.

23. The method of claim 21, wherein the first reference signal measurement and the compensated second reference signal measurement are used to compute a reference signal time difference (RSTD) measurement between the first reference signal transmitted by the reference RF transmitter and the second reference signal transmitted by the neighboring RF transmitter.

24. The method of claim 19, wherein the compensation data is determined during a calibration procedure and stored in non-volatile memory.

25. The method of claim 19, wherein the compensation data is determined online by measuring a certain cell in multiple configurations.

26. A mobile device comprising:
a multi-antenna radio frequency (RF) transceiver;
a memory; and
one or more processors coupled to the memory and the multi-antenna RF transceiver, the one or more processors configured to:
measure a first reference signal from a reference RF transmitter while the multi-antenna RF transceiver is in a first reference signal antenna configuration to obtain a first reference signal measurement;

measure a second reference signal from a neighboring RF transmitter while the multi-antenna RF transceiver is in a second reference signal antenna configuration to obtain a second reference signal measurement;

determine whether the first reference signal antenna configuration is different from the second reference signal antenna configuration;

responsive to a determination that the second reference signal antenna configuration is different from the first reference signal antenna configuration, retrieve compensation data from the memory; and compensate the second reference signal measurement using the compensation data to obtain a compensated second reference signal measurement.

27. The mobile device of claim 26, wherein the first reference signal and the second reference signal comprise positioning reference signal (PRS).

28. The mobile device of claim 27, wherein the first reference signal measurement and the compensated second reference signal measurement comprise timing measurements.

29. The mobile device of claim 28, wherein the compensation data includes a group delay between the first reference signal antenna configuration and the second reference signal antenna configuration.

30. The mobile device of claim 28, the one or more processors further configured to:

compute a reference signal time difference (RSTD) measurement between the first reference signal transmitted by the reference RF transmitter and the second reference signal transmitted by the neighboring RF transmitter using the first reference signal measurement and the compensated second reference signal measurement.

31. The mobile device of claim 26, wherein the compensation data is determined during a calibration procedure and stored in non-volatile memory.

32. The mobile device of claim 26, the one or more processors further configured to:

determine the compensation data online by measuring a certain cell in multiple configurations.

* * * * *